(12) United States Patent
Ewell, Jr.

(10) Patent No.: US 8,380,161 B2
(45) Date of Patent: *Feb. 19, 2013

(54) APPARATUS, SYSTEM, AND METHOD FOR DISABLING A MOBILE COMMUNICATOR

(75) Inventor: Robert C. Ewell, Jr., Ballston Spa, NY (US)

(73) Assignee: Mobile Communication Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,122

(22) Filed: Jun. 17, 2011

(65) Prior Publication Data

US 2011/0244825 A1 Oct. 6, 2011

Related U.S. Application Data

(60) Division of application No. 11/832,432, filed on Aug. 1, 2007, now abandoned, and a continuation-in-part of application No. 10/908,377, filed on May 10, 2005, now Pat. No. 7,590,405.

(51) Int. Cl.
*H04M 11/04* (2006.01)

(52) U.S. Cl. .............. 455/404.1; 455/404.2; 455/456.1; 455/565

(58) Field of Classification Search .............. 455/404.1, 455/404.2, 456.1–457, 565
See application file for complete search history.

(56) References Cited

U.S. PATENT DOCUMENTS

| | | | |
|---|---|---|---|
| 5,844,544 A | 12/1998 | Kahn et al. | |
| 5,886,683 A | 3/1999 | Tognazzini et al. | |
| 5,892,447 A | 4/1999 | Wilkinson | |
| 6,108,532 A | 8/2000 | Matsuda et al. | |
| 6,115,607 A | 9/2000 | Holeman | |
| 6,282,553 B1 | 8/2001 | Flickner et al. | |
| 6,377,813 B1 | 4/2002 | Kansakoski et al. | |
| 6,496,703 B1 | 12/2002 | Da Silva | |
| 6,556,810 B2 | 4/2003 | Suzuki | |
| 6,633,762 B1 | 10/2003 | Rauscher | |
| 6,633,950 B1 | 10/2003 | Brown et al. | |
| 6,636,732 B1 | 10/2003 | Boling et al. | |
| 6,662,023 B1 | 12/2003 | Helle | |

(Continued)

FOREIGN PATENT DOCUMENTS

JP 2005303384 A 10/2005

OTHER PUBLICATIONS

Application No. PCT/US2010/060014, International Search Report and the Written Opinion of the International Searching Authority, or the Declaration dated Mar. 10, 2011, 11 pages.

(Continued)

*Primary Examiner* — Ariel Balaoing
*Assistant Examiner* — Yungsang Lau
(74) *Attorney, Agent, or Firm* — Schmeiser, Olsen & Watts, LLP

(57) ABSTRACT

Provided is a mobile communicator apparatus comprising a locational tracking unit and a disabling circuit. The locational tracking unit determines the location of the mobile communicator. The disabling circuit is configured to change the state of the mobile communicator from an enabled state, wherein the audible receiving and transmitting functions of the mobile communicator are enabled, to a disabled state, wherein the audible receiving and transmitting functions of the mobile communicator are disabled when the location of the mobile communicator as determined by the locational tracking unit satisfies the at least one condition. Also provided is a corresponding mobile communicator disabling system comprised of a mobile communicator apparatus and a network of signal transceivers and a corresponding method for disabling a mobile communicator apparatus.

20 Claims, 13 Drawing Sheets

U.S. PATENT DOCUMENTS

| | | |
|---|---|---|
| 6,687,497 B1 | 2/2004 | Parvulescu et al. |
| 6,690,940 B1 | 2/2004 | Brown et al. |
| 6,694,143 B1 | 2/2004 | Beamish et al. |
| 6,771,946 B1 | 8/2004 | Oyaski |
| 6,823,199 B2 | 11/2004 | Gough |
| 6,871,063 B1 | 3/2005 | Schiffer |
| 6,934,547 B2 | 8/2005 | Suzuki |
| 6,967,580 B1 | 11/2005 | Schulze |
| 6,973,333 B1 | 12/2005 | O'Neil |
| 7,065,349 B2 | 6/2006 | Nath et al. |
| 7,088,225 B2 | 8/2006 | Yoshioka |
| 7,113,170 B2 | 9/2006 | Lauper et al. |
| 7,123,874 B1 | 10/2006 | Brennan |
| 7,187,953 B2 | 3/2007 | Bauchot et al. |
| 7,308,247 B2 | 12/2007 | Thompson et al. |
| 7,343,148 B1 | 3/2008 | O'Neil |
| 7,505,784 B2 | 3/2009 | Barbera |
| 7,590,405 B2 | 9/2009 | Ewell, Jr. |
| 7,719,520 B2 | 5/2010 | Singh et al. |
| 7,762,665 B2 | 7/2010 | Vertegaal et al. |
| 2001/0051514 A1 | 12/2001 | Lindholm |
| 2002/0090919 A1 | 7/2002 | Hofman |
| 2002/0128000 A1 | 9/2002 | do Nascimento, Jr. |
| 2002/0164979 A1 | 11/2002 | Mooney et al. |
| 2002/0173301 A1 | 11/2002 | Ikeda |
| 2002/0193107 A1 | 12/2002 | Nascimento, Jr. |
| 2002/0198005 A1 | 12/2002 | Hilton et al. |
| 2003/0045322 A1 | 3/2003 | Baer et al. |
| 2003/0050039 A1 | 3/2003 | Baba et al. |
| 2004/0077339 A1 | 4/2004 | Martens |
| 2004/0110421 A1 | 6/2004 | Takamura |
| 2004/0171407 A1 | 9/2004 | Ninomiya |
| 2004/0176083 A1 | 9/2004 | Shiao et al. |
| 2004/0198306 A1 | 10/2004 | Singh et al. |
| 2004/0203554 A1 | 10/2004 | Simon |
| 2004/0204003 A1 | 10/2004 | Soerensen et al. |
| 2004/0204021 A1 | 10/2004 | Cocita |
| 2004/0229645 A1 | 11/2004 | Montgomery |
| 2005/0026644 A1 | 2/2005 | Lien |
| 2005/0255874 A1 | 11/2005 | Stewart-Baxter et al. |
| 2006/0003809 A1 | 1/2006 | Boling et al. |
| 2006/0066567 A1 | 3/2006 | Scharenbroch et al. |
| 2006/0099940 A1 | 5/2006 | Pfleging et al. |
| 2006/0148490 A1 | 7/2006 | Bates et al. |
| 2006/0240860 A1 | 10/2006 | Benco et al. |
| 2006/0258376 A1 | 11/2006 | Ewell, Jr. |
| 2007/0024579 A1 | 2/2007 | Rosenberg |
| 2007/0078552 A1 | 4/2007 | Rosenberg |
| 2007/0164990 A1 | 7/2007 | Bjorklund et al. |
| 2007/0270122 A1 | 11/2007 | Ewell, Jr. |
| 2008/0169914 A1 | 7/2008 | Albertson et al. |
| 2008/0299900 A1 | 12/2008 | Lesyna |
| 2008/0299954 A1 | 12/2008 | Wright et al. |
| 2008/0305735 A1 | 12/2008 | Farnsworth et al. |
| 2009/0029675 A1 | 1/2009 | Steinmetz et al. |
| 2009/0117919 A1 | 5/2009 | Hershenson |
| 2009/0163243 A1 | 6/2009 | Barbera |
| 2009/0215466 A1 | 8/2009 | Ahi et al. |
| 2009/0253423 A1 | 10/2009 | Kullberg |
| 2009/0270143 A1 | 10/2009 | Bury |
| 2010/0093405 A1 | 4/2010 | Ewell, Jr. |
| 2010/0156781 A1 | 6/2010 | Fahn |
| 2010/0182243 A1 | 7/2010 | Singh et al. |
| 2010/0197351 A1 | 8/2010 | Ewell, Jr. |

OTHER PUBLICATIONS

Office Action (Mail Date Nov. 22, 2010) for U.S. Appl. No. 11/832,432, filed Aug. 1, 2007.

Office Action (Mail Date Aug. 17, 2012) for U.S. Appl. No. 12/638,290, filed Mar. 23, 2010.

APPARATUS, SYSTEM, AND METHOD FOR DISABLING A MOBILE COMMUNICATOR

RELATED APPLICATIONS

The present invention is a divisional application claiming priority to U.S. patent application Ser. No. 11/832,432, filed on Aug. 1, 2007 and a continuation-in-part of co-pending U.S. patent application Ser. No. 10/908,377, filed May 10, 2005 and entitled "Apparatus for Enabling a Mobile Communicator and Methods of Using the Same" and is incorporated herein by reference in its entirety.

FIELD OF THE TECHNOLOGY

The present invention relates generally to an apparatus and method for using a mobile communication device, and more specifically to an apparatus and method for controlling the mobile communication device.

BACKGROUND

Mobile or wireless cell phones or other wireless mobile communication devices such as two way radios have become popular devices for communicating when away from home or the office. Some people rely exclusively on wireless mobile communication devices because they may be carried on their persons, so their mobile communicator may always be accessible. This ubiquitous nature of wireless cell phones may be a disadvantage because cell phones may not be bound by use restrictions that may be placed on wired phones, when conditions arise in which cell phone use may need to be limited.

Therefore there is a need for controlling cell phone use when conditions arise in which cell phone use may need to be limited.

SUMMARY

A first aspect of the present invention provides a Mobile Communicator, comprising: an Enabling System, wherein the Enabling System includes a Global Positioning System (GPS) Receiver and an Enabling Circuit, wherein a logic of the Enabling Circuit has changed a Default Disabled State of the Mobile Communicator to an Enabled State because an at least one condition has been satisfied.

A second aspect of the present invention provides a kit for enabling a Mobile Communicator, comprising: a Mobile Communicator having an initial Default Disabled State; and an Enabling System, wherein the Enabling System includes a Global Positioning System (GPS) Receiver and an Enabling Circuit, and wherein a logic of the Enabling Circuit has enabled the Mobile Communicator because an at least one condition has been satisfied.

A third aspect of the present invention provides a method for enabling a Mobile Communicator, comprising: providing a Global Positioning System (GPS) and an Enabling System in the Mobile Communicator, wherein the Mobile Communicator is in a Default Disabled State; satisfying an at least one condition for enablement of the Mobile Communicator; and enabling the Mobile Communicator.

A fourth aspect of the present invention provides an apparatus for a mobile communicator, comprising: a locational tracking for determining the location of the mobile communicator; and a disabling circuit for changing the state of the mobile communicator from an enabled state, wherein the audible receiving and transmitting functions of the mobile communicator are enabled, to a disabled state, wherein the audible receiving and transmitting functions of the mobile communicator are disabled when the location of the mobile communicator as determined by the locational tracking unit satisfies at least one condition.

A fifth aspect of the present invention provides a mobile communicator disabling system, comprising: a mobile communicator, wherein the mobile communicator includes a locational tracking unit configured to determine the location of the mobile communicator; and a disabling circuit configured to change the state of the mobile communicator from an enabled state, wherein the audible receiving and transmitting functions of the mobile communicator are enabled, to a disabled state, wherein the audible receiving and transmitting functions of the mobile communicator are disabled; and a network of signal transceivers located in specific and known locations, wherein said network of signal transceivers is configured to communicate with the locational tracking unit to determine the location of the mobile communicator and the mobile communicator is disabled by the disabling circuit when an at least one condition is satisfied.

A sixth aspect of the present invention provides a method for disabling a mobile communicator, comprising: providing a locational tracking unit and a disabling circuit to the mobile communicator, wherein the mobile communicator is in an initial enabled state; determining the location of the mobile communicator; determining that at least one condition for disablement of the mobile communicator is satisfied; and disabling the mobile communicator.

BRIEF DESCRIPTION OF THE DRAWINGS

FIG. 11 is a diagram of logic within the mobile communicator apparatus, in accordance with the present invention;

DESCRIPTION OF THE TECHNOLOGY

Mobile cell phones or other mobile communication devices such as two way radios have become popular devices for communicating when away from home or the office. Some people rely exclusively on mobile communication devices because they may be carried on their persons, so they can always be near their mobile communicator.

Firstly, this ubiquitous nature of cell phones may be a disadvantage when a user receives or transmits a call from a cell phone within a proximity of other people because it may interfere with their enjoyment of their quiet and solitude.

Hereinafter, "proximity of other people" is defined as within a listening distance of the other people.

Secondly, the ubiquitous nature of cell phones may also be disadvantageous for companies that wish to prevent their trade secrets or other proprietary information from being communicated to the outside world via a cell phone, or by a camera accessory of a cell phone, by an employee or other visitor having access to the trade secrets or other proprietary information.

Thirdly, the ubiquitous nature of cell phones may also be disadvantageous because of safety concerns. Many states such as New York State have enacted laws prohibiting an operator of a moving vehicle from holding a mobile communication device while operating the vehicle in order to reduce the number of moving vehicle accidents that may occur as a result of operators of moving vehicles using mobile communication devices during operation of the vehicle.

Therefore, there is a need for providing safeguards to avoid safety hazards or interference with the quiet and solitude of others resulting from use of cell phones or other mobile communication devices.

Many states such as New York State have enacted laws prohibiting an operator of a moving vehicle from holding a mobile communication device while operating the vehicle in order to reduce the number of moving vehicle accidents that may occur as a result of operators of moving vehicles using mobile communication devices during operation of the vehicle.

Therefore there is a need for equipping a Mobile Communicator such as a cell phone so that some or all of its transmitting and audible receiving functions 680 may remain in a Disabled State unless certain conditions for Enabling the transmitting and audible receiving functions 680 are satisfied. Non-limiting examples of the transmitting and audible receiving functions 680 include ringer notification of messages or incoming calls, calling in/out, e.g., making incoming and outgoing calls from the Mobile Communicator 370, use of photocopying accessories such as a camera, use of microcomputer accessories, such as palm pilots, as user interfaces for text messaging or email, electronic communicators and combinations thereof.

Figure 1:
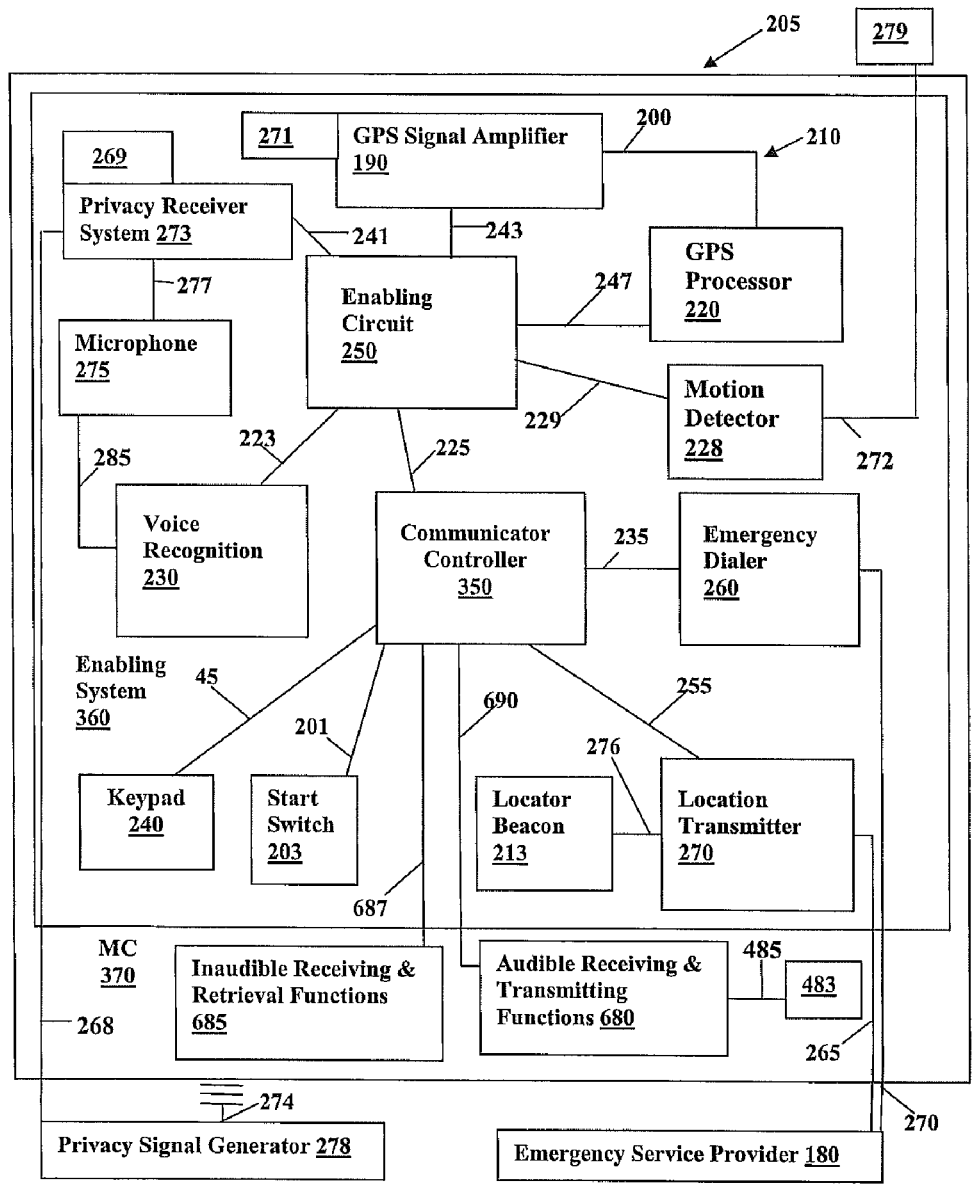
FIG. 1 depicts a kit and a Mobile Communicator, in accordance with embodiments of the present invention.

FIG. 1 depicts a kit 205 or a Mobile Communicator 370, comprising: an Enabling System 360, wherein the Enabling System 360 includes a "Start Switch" 203 for activating the kit 205 or the Mobile Communicator 370 if an at least one condition is satisfied, and wherein an outgoing call to an Emergency Service Provider 180 may always be enabled by the Enabling System 360. Alternatively, the kit 205 or the Mobile Communicator 370 may remain in a Default Disabled State 410 if the at least one condition is not satisfied, even if the Start Switch 203 may be activated. The Enabling System 360 may include a keypad 240 for inputting information into the Communicator Controller 350, such as passwords for user identification by the Communicator Controller 350, a Location Transmitter 270 for transmitting a location of the kit 205 or the Mobile Communicator 370, a Locator Beacon 213, for giving notice, such as an alarm, such as a flashing light or an audible sound, as to a geographical location of the kit 205 or the Mobile Communicator 370, an Emergency Dialer 260, for calling an emergency service provider such as the Emergency Service Provider 180, a Global Positioning System (GPS) Receiver 210, a Privacy Receiver System 273, having a privacy signal antenna 269, a Voice Recognition System 230, a Motion Detector 228, a Microphone 275 and an Enabling Circuit 250. Although the Microphone 275 may by any device able to convert sound(s) wave(s) into an electrical signal, the Microphone 275 may have the following specifications: 100-10 KHz frequency response; low impedance; normal and zoom settings; an effective output level from about −66 dB+/−3 dB unbalanced (normal); −79 dB+/−3 dB unbalanced (zoom); and a Microphone 275 range to 80 dB.

The Microphone 275 may provide received sound(s) to the Voice Recognition System 230 via the wire 285, or wirelessly, or to the Privacy Receiver System 273 via the wire 277, or wirelessly. A Privacy Signal Generator 278 may provide a privacy signal to the Microphone 275 wirelessly by transmitting from the antenna 274. The Microphone 275 may provide the privacy signal received wirelessly from the antenna 274 to the Privacy Receiver System 273 via a wire 277, or wirelessly. The Privacy Signal Generator 278 may provide the privacy signal to the Privacy Receiver System 273 wirelessly, wherein the antenna 274 of the Privacy Signal Generator 278 may transmit and the antenna 269 of the Privacy Signal Receiver 273 may receive the privacy signal. Alternatively, the Privacy Signal Generator 278 may provide the privacy signal to the Privacy Receiver 273 via a wire 268, or wirelessly. The Enabling Circuit 250 may include a logic that enables the Mobile Communicator 370 if at least one of a number of conditions may be satisfied, and wherein outgoing calls to an Emergency Service Provider 180 may always be enabled by the Enabling System 360. Hereinafter "enabling the Mobile Communicator 370" is defined as making the Mobile Communicator's 370 transmitting and audible receiving functions 680 operational; to activate the Mobile Communicator's 370 transmitting and audible receiving functions 680. Hereinafter, "logic" is defined as non-arithmetic operations performed by a logic circuit (not shown) in the Enabling Circuit 250 or in a computer (not shown), such as sorting, comparing, and matching, that involve yes-no decisions, wherein the logic may be provided by computer software or the computer circuit that may be located in the Enabling Circuit 250 or in the computer (not shown).

The "Start Switch" 203 may be any appropriate means of opening or closing an electrical circuit in the Communicator Controller 350 via a wire 201, or wirelessly, such as a contact closure. Hereinafter, a contact closure may be a variety of electrical switches in an electrical circuit that may be open, i.e., having infinite electrical resistance, or closed, i.e., being electrically conducting. The contact closure may be the Start Switch 203 providing a contact closure to the Communicator Controller 350, via the wire 201, or wirelessly, and the electrical circuit may include the Communicator Controller 350 and at least one other component of the Enabling System 360, such as the Enabling Circuit 250, via the wire 225, or wirelessly, the Emergency Dialer 260, via the wire 235, or wirelessly, or the Location Transmitter 270, via the wire 255, or wirelessly. Alternatively, the contact closure may be in the Enabling Circuit 250 providing a contact closure for the Communicator Controller 350, via the wire 225, or wirelessly, and the electrical circuit may include the Communicator Controller 350, the Enabling Circuit 250, via the wire 225, or wirelessly, and the Enabling Circuit 250 and at least one other component of the Enabling System 360, such as the GPS Receiver 210, via the wires 200, 243, 247, or wirelessly, and the Voice Recognition System 230, via the wire 223, or wirelessly, and the Motion Detector 228, via the wire 229, or wirelessly, and the Privacy Receiver System 273, via the wire 241, or wirelessly. When the contact closure is closed, the electrical circuit that may include the Communicator Controller 350 and the Enabling Circuit 250 may be complete and functional. Alternatively, when the contact closure is open, the electrical circuit that may include the Communicator Controller 350 and the Enabling Circuit 250 is open and non-functional. When the electrical circuit is open and non-functional the transmitting and audible receiving functions 680 of the kit 205 or the Mobile Communicator 370 may remain in the Default Disabled State 410.

In embodiments of the kit 205 or the Mobile Communicator 370 and of the methods 400, 450 and 465 described herein, Data Retrieval & Inaudible Receiving Functions 685 may remain enabled if the at least one condition (420-480) may not be satisfied. Non-limiting examples of Data Retrieval & Inaudible Receiving Functions 685 include ability to receive incoming calls as messages, vibrator or optical notification of incoming messages, visual page, accessing phone numbers or other stored information, personal schedules, and combinations thereof.

Alternatively, when the electrical circuit is closed and functional the transmitting and audible receiving functions 680 of the kit 205 or the Mobile Communicator 370 may be changed from the Default Disabled State 410 to the Enabled State 510 if an at least one condition (420-480) may be satisfied, as in the methods 400, 450, and 465 described herein, because the Communicator Controller 350 may drive the Enabled State 510 transmitting and audible receiving functions 680 of the kit 205 or the Mobile Communicator 370 if the Communicator Controller 350 has received a contact closure from either the Start Switch 203 or the Enabling Circuit 250. The Communicator Controller 350 may drive the transmitting and audible receiving functions 680 via the wire 690, or wirelessly.

The at least one condition for what conditions must be met so that the kit 205 or the Mobile Communicator 370 may be enabled may be that there is an emergency, wherein calling an Emergency Service Provider 180 and/or triggering a Location Transmitter 270 may be enabled if there has been an emergency. Alternatively, the at least one condition may be that the GPS Receiver 210 receives a GPS Signal, wherein transmitting and audible receiving functions 680 of the Mobile Communicator 370 may be enabled if a GPS signal is received.

Hereinafter, the GPS signal received by the GPS Receiver 210 is defined as any signal that provides geographic location information in the signal as to a longitude and latitude location of the kit 205 or the Mobile Communicator 370 on the Earth. Such signals and information may be obtained from a source such as a GPS satellite, a cell phone provider, or any other provider of the signal having longitude and latitude information about the location of the kit 205 or the Mobile Communicator 370 on the Earth.

Alternatively, the at least one condition may be that the Mobile Communicator 370 has a speed ≦a setpoint, wherein audible receiving and transmitting functions 680 of the Mobile Communicator 370 may be enabled if the speed of the Mobile Communicator is ≦the setpoint. Alternatively, the at least one condition may be that a user's voice or password is authenticated, wherein transmitting and audible receiving functions 680 of the Mobile Communicator 370 may be enabled if the user's voice or identifying sound(s) or password are authenticated. The Voice Recognition System 230 may authenticate a user by determining that each sound(s) provided by the user essentially matches a preprogrammed or recorded user identifying sound(s). Alternatively, the at least one condition may be that the Mobile Communicator 370 receives a privacy signal, wherein transmitting and audible receiving functions 680 of the Mobile Communicator 370 may be enabled if the Mobile Communicator 370 receives the privacy signal. The privacy signal may include signals from broadcast and pager systems, signals from optical/infrared system, signals from acoustic/ultrasonic systems, 2.4 GHz, audible sounds, inaudible sounds and combinations thereof.

The Enabling System 360 of the kit 205 may include a Global Positioning System (GPS) Receiver 210, a Privacy Signal Receiver 273, and a Communicator Controller 350. The GPS Receiver 210 may include a GPS Signal Amplifier 190 for amplifying a GPS signal and a GPS Processor 220. The GPS Signal Amplifier 190 may include a GPS Antenna 271. The GPS Signal Amplifier 190 may communicate the amplified GPS signal to the GPS Processor 220 via a wire 200, or wirelessly. Alternatively, the amplified GPS signal may be transmitted to the GPS Processor 220 by the GPS Signal Amplifier 190 wirelessly using, for example, Wi-Fi protocol. The Privacy Signal Receiver 273 may receive a privacy signal from Microphone 275, via a communicating wire 277, or wirelessly. The Privacy Signal Generator 278 may generate the privacy signal wirelessly using, for example, Wi-Fi protocol. The GPS Processor 220 may process the information from the GPS Signal Amplifier 190 to determine a speed and/or a geographic location of the Mobile Communicator 370. Hereinafter "geographic location" includes a longitude and latitude from which a position on the earth's surface may be determined. The GPS Processor 220 may provide said speed and geographic location information to the Enabling Circuit 250 via wire 247, or wirelessly. The Privacy Receiver System 273 may provide a privacy signal to the Enabling Circuit 250 via the wire 243, or wirelessly. Different types of privacy signals employed may be signals from broadcast and pager systems, optical/infrared system, and acoustic/ultrasonic systems. Alternatively, the privacy signal may operate at 2.4 GHz.

In one embodiment of the Mobile Communicator 370 and the kit 205, not receiving the privacy signal enables transmitting and audible receiving functions 680 of the Mobile Communicator 370 in a restricted use area. The restricted use area may include a theater, a sports tournament, a hospital, a church, a waiting room, a locker room, a library, a spa, a vehicle, a business area housing trade secrets or confidential information, a conference room in which trade secrets or confidential proprietary information are discussed and combinations thereof. A vehicle may be any transportation vehicle that carries passengers, such as an airplane, an automobile, a coach in a train. However, the restricted use area may be any area in which privacy, quiet or enjoyment of solitude may be desired and in which transmitting and audible receiving functions 680 of the kit 205 of the Mobile Communicator 370 may interfere. The Microphone 275 of the kit 205 or the Mobile Communicator 370 that is used for receiving the Privacy Signal and for voice recognition may be the same Microphone 275 a user may speak into to make outgoing calls and for receiving and transmitting function of the kit 205 and the Mobile Communicator 370.

The GPS Receiver 210 may use National Marine Electronics Association (NEMA) standards for data communication between marine instruments GPS protocol (as used between a GPS and Autopilot, for example). The GPS Receiver 210 may be designed to provide a low cost alternative to other geographic location devices that require high precision and/or accuracy. The GPS Receiver 210 may have a GPS Signal Amplifier 190 having an active GPS Antenna 271. The GPS Receiver 210 may have a RS-232 output for connection to a PC or navigation system and may be enclosed in an essentially 100% waterproof, pole mount case. The NMEA RS-232 output may provide an easy connection to a PC to translate and process the GPS Receiver 210 data strings. The GPS 213 may be accurate: position horizontal, +/−15 m 2D RMS (SA off), velocity, 0.1 m/sec 95% (SA off), 1 micro-second synchronized to GPS time, WASS, +/−10 m 2D RMS.

The Enabling System 360 may include a Voice Recognition System 230, and a Microphone 275, for inputting an identifiable or distinguishable sound(s). The user identifying sound(s) may be the voice of a user or a user identifying tone or frequency, such as a tone from a tuning fork, a musical note or clip, an animal sound, or any sound by which a user may wish to be identified. The user identifying sound(s) may be inaudible to the human ear such as high frequency or low frequency sounds that are outside of a range of the human ear, such as a dog whistle, having a tone that has been recorded by the Voice Recognition System 230 and may be compared to the identifying sound provided by a user to be authenticated by the Voice Recognition System 230. Hereinafter, comparing the identifying sound(s) provided by a user to be authenticated by the Voice Recognition System 230 to the recorded user identifying sound(s) is a first step in a process by which the Voice Recognition System 230 may "recognize" or "authenticate" a user of the kit 205 or the Mobile Communicator 370. A second step in the process may be determining if the identifying sound(s) may match or be essentially identical to the preprogrammed or pre-recorded identifying sound(s). The comparing and matching steps may compare and match features of the identifying sound(s) that include frequency, pitch, volume, and interval between musical notes, syllables of words and the like. The at least one condition to be satisfied for enablement of the transmitting and audible receiving functions 680 of the kit 205 or the Mobile Communicator 370 may be that the comparison of the identifying sound(s) provided by the user to be authenticated is determined by the Voice Recognition System 230 to be essentially identical or essentially matches the preprogrammed or recorded identifying sound(s) in the Voice Recognition System 230. Hereinafter, user identifying sound(s) include the voice of a user or an identifying tone or frequency, such as a tone from a tuning fork or inaudible sounds such as a dog whistle, having a tone recognizable by the Voice Recognition System 230. The Microphone 275 may provide the user identifying sound(s) or password to the Voice Recognition System 230 via a wire 285, or wirelessly, and the Voice Recognition System 230 may provide or signal that the user's voice has been recognized or authenticated to the Enabling Circuit 250 via a wire 223, or wirelessly.

The Voice Recognition System 230 may determine that the user authorization condition has been satisfied by authenticating the user identifying sound(s) that the user provides into the Microphone 275. "Authenticating" or "authentication" is defined as determining the authenticity or identity of the user identifying sound(s) that the user provides into the Microphone 275 by comparing the user identifying sound(s) to authentic or actual user identifying sound(s) that have been recorded or preprogrammed into the Voice Recognition System 230 so that the Voice Recognition System 230 may recognize the user's voice or sound(s) to identify them, i.e., authenticate them to the Enabling System 360 of the kit 205 or the Mobile Communicator 370. The at least one condition to be satisfied for enablement of the transmitting and audible receiving functions 680 of the kit 205 or the Mobile Communicator 370 may be that a user's voice is authenticated. The at least one condition to be satisfied for providing identification of the user to the Emergency Service Provider and triggering a Locator Beacon may be entry of an authenticated password or authenticated voice.

The Enabling Circuit 250 may receive a signal indicating authentication from the Voice Recognition System 230 via wire 223, or wirelessly. The Voice Recognition System 230 may receive the user-identifying voice or the frequency of the user-identifying sound(s) from the Microphone 275 through the wire 285, or wirelessly.

A user placing or originating an outgoing call from the Mobile Communicator 370 may be authenticated by the Voice Recognition System 230. The Voice Recognition System 230 may authenticate the user by determining that a pattern of frequencies of the sound(s) provided by the user include sounds audible to a human ear or sounds inaudible to a human ear matches or may be essentially identical to a preprogrammed or recorded pattern of the frequencies of the user identifying sound(s) that may be preprogrammed or recorded in the Voice Recognition System 230.

Once having been authenticated by the Voice Recognition System 273, a user may enable the transmitting and audible receiving functions 680 of the kit 205 or the Mobile Communicator 370 by speaking or verbalizing a name of a person to be called that has been preprogrammed or recorded in the Enabling System 360, such as in an address book 483. Thus, the user may place a call to a telephone number of a person in the address book 483 by speaking or verbalizing the person's name or any other preprogrammed or recorded tag attached to the person's name, such as nicknames. The address book 483 may provide preprogrammed or recorded names for recall from the address book 483 by the authenticated user via a wire 485, or wirelessly.

Embodiments of the present invention may be used to communicate an identity of a user who places a call for emergency services to the Emergency Services Provider 180. For example, an authorized user may identify himself to the Emergency Services Provider 180 by providing an authenticated password or authenticated voice to the Enabling System 360 of the kit 205 or the Mobile Communicator 370. Providing an authenticated password or authenticated voice or authenticated sound(s) to the Enabling System 360 of the kit 205 or the Mobile Communicator 370 may trigger an Emergency Dialer 260 and Locator Beacon 213. The Microphone 275 of the Mobile Communicator 370 that is used to input the user identifying sound(s) or verbal password for authentication by the Voice Recognition System 230 and to input a privacy signal may be the same Microphone used for making outgoing calls. The inventor has found use of the same Microphone 275 for making outgoing calls and for inputting the user identifying sound(s) or verbal password for authentication by the Voice Recognition System 230, or for inputting the privacy signal for satisfying the Privacy Receiver System 273, may render methods of bypassing the Voice Recognition System 230 or the Privacy Receiver System 273 impossible. For example, shielding the Voice Recognition System 273 or the Privacy Receiver System 273 so that it may not receive the user identifying sound(s) or verbal password for authentication by the Voice Recognition System 230, or the privacy signal for satisfying the Privacy Receiver System 273 would also shield the Microphone 275 from receiving the user's voice message that would interfere or prohibit the Microphone 275 from being used to make outgoing calls.

The Enabling Circuit 250 may provide go/no go logic such that an authenticated voice may activate the Communicator Controller 350, resulting in enablement of the Mobile Communicator's 370 incoming/outgoing calls and other transmitting and audible receiving functions 680, including calling the Emergency Service Provider 180, other emergency numbers such as 911 and/or triggering the Locator Beacon 213. Alternatively, the Communicator Controller 370 may be activated by providing a password or Personal Identification Number (PIN) or alphanumeric combination of numbers and letters using the keypad 240.

Alternatively, the Voice Recognition System 230 may be equipped with a Wi-Fi receiver that may enable the Voice Recognition System 230 to receive the user-identifying voice or the frequency of the user-identifying sound from the microphone 275 via wireless transmission using Wi-Fi protocol and a Wi-Fi transmitter. Hereinafter "Wi-Fi" refers to wireless fidelity and is meant to be used generically when referring of any type of 802.11 network, that 802.11b, 802.11a, dual-band, etc. The term is promulgated by the Wi-Fi Alliance.

Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (for example, 2.4 GHz for 802.11b or 11 g, 5 GHz for 802.11a) will work with any other, even if not "Wi-Fi Certified."

Formerly, the term "Wi-Fi" was used only in place of the 2.4 GHz 802.11b standard, in the same way that "Ethernet" is used in place of IEEE 802.3. The Alliance expanded the generic use of the term in an attempt to stop confusion about wireless LAN interoperability.

The Enabling Circuit 250 may contain logic that queries that certain conditions have been satisfied so that the Enabling System 360 may enable the Mobile Communicator 370. The Enabling Circuit 250 may provide a contact closure via a wire 225, or wirelessly, that completes an electrical circuit between the Enabling Circuit 250 and the Communicator Controller 350, enabling the Communicator Controller 350 to drive Enabled State 510 transmitting and audible receiving functions 680 of the kit 205 or the Mobile Communicator 370 when an answer to the query as to that the certain condition has been satisfied is "yes." However, the contact closure may not be provided to the Communicator Controller 350 when the answer to the query as to that the certain condition has been satisfied is "no." The Communicator Controller 350 may drive certain Enabled State 510 transmitting and audible receiving functions 680 via a wire 690, or wirelessly, or inaudible or suppressed receiving and transmitting functions 685 of the Mobile Communicator 370 via a wire 687, or wirelessly, when the Communicator Controller 350 may receive the contact closure from the Enabling Circuit 250, i.e., when the certain condition has been satisfied. The Enabled State 510 transmitting and audible receiving functions 680 include ringer notification of messages or incoming calls, calling in/out, e.g., making incoming and outgoing calls from the Mobile Communicator 370, and combinations thereof. The Enabled State 510 inaudible or suppressed receiving and transmitting functions 685 include a vibrator notification, a camera, a palm pilot, text messaging, message receipt and storage, internet connectivity, silent mode, selective suppression or damping of portions of frequencies of transmissions such as high frequency portion, substitution of video or audio output for suppressed output, and combinations thereof.

The Enabling System 360 may include a Keypad 240, for inputting information to the Communicator Controller 350 via a wire 245. Alternatively, the keypad 240 may input information to the Communicator Controller 350 wirelessly.

The kit 205 or the Mobile Communicator 370 may be enabled for hands-free calling when the at least one condition for enablement of the kit 205 or the Mobile Communicator 370 has been satisfied. A purpose of hands-free calling is to enable use of the kit 205 or the Mobile Communicator 370 when a user's hands are not available to operate the kit 205 or the Mobile Communicator 370, such as for activating the Start Switch 203. Hereinafter, "hands-free calling" or "hands-free operation" is defined as allowing a user to retrieve a preprogrammed name and phone number of the person to be called from an address book 483. A user may enable the transmitting and audible receiving functions 680 of the kit 205 or the Mobile Communicator 370 by speaking or verbalizing the name that has been preprogrammed or recorded in the Enabling System 360, such as in the address book 483. Thus, the user may place a call to a telephone number of a person whose name and number may have been stored in the address book 483 by speaking or verbalizing the person's name or any other preprogrammed or recorded tag attached to the person's name, such as nicknames. The address book 483 may provide preprogrammed or recorded names for recall from the address book 483 by the authenticated user via a wire 485, or wirelessly.

The Communicator Controller 350 may also drive a voice activated Emergency Dialer 260 and/or a Location Transmitter 270. A user may simply speak or verbalize a predetermined call for assistance, such as a word or phrase, e.g., "help" into the Microphone 275, or input the word "help" into the Communicator Controller 350 via the keypad 240 to make the Emergency Dialer 260 and/or a Location Transmitter 270 operational. Simply speaking or verbalizing the predetermined call for assistance, such as a word or phrase, e.g., "help" into the Microphone 275, such that the Communicator Controller 350 may drive the kit 205 or the Mobile Communicator 370 to call the Emergency Service Provider 180 and/or notify the Location Transmitter 270 when the user speaks the predetermined word or phrase into the Microphone 275 or inputs the word or phrase into the Communicator Controller 350 via the keypad 240.

Causes for such a call to the Emergency Service Provider 180 for help may include calls for any assistance, such as when hiking if the user may be lost and may need directions to find a safe resting place, or to be rescued because of unexpected weather or that there isn't time to return to safety before nightfall. Alternatively the user may be experiencing an emergency, such as a medical emergency or because of a threat against the user's safety.

The Communicator Controller 350 may drive an Emergency Dialer 260 and a Location Transmitter 270 for automatically dialing for example, 911, in the United States, and transmitting a location of the kit 205 or the Mobile Communicator 370 to an Emergency Service Provider 180. The Emergency Dialer 260 may communicate with the Emergency Service Provider 180 via a wire 270 or wirelessly. The Location Transmitter 270 may communicate with the Emergency Service Provider 180 via a wire 265 or wirelessly. The outgoing call to the Emergency Service Provider 180 may trigger the Location Transmitter 270. The Location Transmitter 270 may be activated by a cell phone signal provider, such as the Emergency Service Provider 180, resulting in a Locator Beacon 213 emitting a locator signal. Alternatively, the Enabling System 360 may contain preprogrammed commands and appropriately designated telephone numbers, e.g., "help, 911," or "call home, XXX-XXXX," or "call Emergency Service Provider, 911," or "police, XXX-XXXX," or "emergency, 911," so that the Enabling System 360 may enable all functions of the Mobile Communicator 370 including audible receiving and transmitting functions 680 and data retrieval and inaudible receiving functions 685 for communicating with the designated telephone number holders and trigger the Location Transmitter 270, so that a user may override the need to determine whether the conditions 420-480 have been satisfied by applying the yes/no logic of the Enabling Circuit 250 if they utter the command into the Microphone 275. The command may be a user identifying sound(s) or a verbal password that may be recognized by the Voice Recognition System 273, or a written command or password inputted into the Communicator Controller 350 via the keypad 240, and if the command has been determined to be essentially identical to or matches the preprogrammed or recorded command, the Enabling Circuit 250 may activate the Communication Controller 350 to enable the transmitting and audible receiving functions 680 of the Mobile Communicator 370, including triggering the Emergency Dialer 260 and/or the Location Transmitter 270. The Location Transmitter 270 may communicate with the Locator Beacon 213 via a wire 276 or wirelessly.

The Communicator Controller 350 may also drive the Emergency Dialer 260 and a Location Transmitter 270 when the user's voice or identifying sound(s) making the outgoing call to the Emergency Service Provider 180 has been authenticated by the Voice Recognition System 230. The voice recognition system 230 may recognize user identifying sound(s) described herein. Satisfaction of the at least one condition for enabling the Mobile Communicator's 370 audible receiving and transmitting functions 680 may require authentication of a user's voice by voice recognition or sound(s) recognition or password recognition. Entry of a password via a keypad 240 or authentication by the Voice Recognition System 230 may provide identification of the user to the Emergency Service Provider 180 and enabling of the Locator Beacon 213.

Referring to the Communicator Controller 350 driving the Location Transmitter 270, it may become necessary for a user to activate the Locator Beacon 213 in order to find the Mobile Communicator 370 if it may be lost or misplaced or obscured from view. Alternatively, when the kit 205 or the Mobile Communicator 370 may be lost or stolen a user may report this to any service provider or to the Emergency Service Provider 180 and a specific signal can be sent to the kit 205 or the Mobile Communicator 370 by the service provider or the Emergency Service Provider 180 which may activate the Location Transmitter 270 to transmit a location provided by the GPS Receiver 210 so the phone may be recovered.

In one embodiment, the user may call in to the Mobile Communicator 370 and instruct the Enabling Circuit 250 of the Enabling System 360 to drive the Communicator Controller 250 to trigger the Location Transmitter 270 and/or the Locator Beacon 213. The Enabling System may require the user to be voice or sound or password authenticated. If there is an interference from background noise that may interfere with reception from the microphone 275 when voice or sound or password authentication is used to trigger the Location Transmitter 270 and/or the Locator Beacon 213, the Location Transmitter 270 and/or the Locator Beacon 213 may be triggered by an input from the keypad 240, such as a password.

Adding the Enabling System 360 to a kit 205 or a Mobile Communicator 370, such as commercially available cell phones, may be an inexpensive improvement having improved functionality that may be easily implemented. The issue today is not does something need to be done to address the safety and privacy issues inappropriate cell phone use represents, but how to do it. One solution to these the safety and privacy issues is legislation requiring cell phones to be disabled whenever they pose safety or privacy risks. Communication devices disclosed in the prior art may be complicated and expensive so that using them to implement these legislative objectives would be politically impractical due to the hardship it would place on the general population. The low cost and simplicity of this device in conjunction with its improvements in emergency use and owner protection from unauthorized use or misuses if the Mobile Communicator 370 may be lost or stolen, makes such needed legislation feasible.

The Enabling System 360 of the kit 205 or the Mobile Communicator 370 may be designed so that the Enabling System 360 may enable a default state so that certain functions of the Mobile Communicator 370 may be disabled when use of the Mobile Communicator 370 may be unsafe or an intrusion upon the personal privacy of bystanders. Enabling the default state and its operation requires no generation of radio or other signal transmission that could create health risks or impinge on other types of communication.

The kit 205 or the Mobile Communicator 370 having the Enabling System 360 may be an improvement over cell phones that depend on a disabling signal of some type to be received in order for the phone to be disabled. Such cell phones may be subject to blocking systems or other workarounds being developed which would result in the cell phones remaining functional because they require a disabling signal, and preventing that signal from getting through may leave such cell phones enabled. In contrast, the Enabling System 360 of the kit 205 or the Mobile Communicator 370 may enable the Default Disabled State when certain required conditions, such as receiving a global positioning system (GPS) signal or receiving a privacy signal, may not be satisfied. Therefore, the Enabling System 360 that enables the enabled state of the Mobile Communicator 370 may not be subject to blocking systems or other workarounds being developed, because blocking the GPS signal or privacy signal in the Mobile Communicator 370 enables the Default Disabled State.

At no time does the function of the Enabling System 360 interfere, or create a condition which could interfere with receiving signals. On the contrary, the Enabling System 360 may require that the GPS Receiver 210 receive a GPS signal. In addition, the Enabling System 360 may also require voice, password or sound(s) authentication for enablement of the Mobile Communicator's 370 calling in/out and/or other functions. The Enabling System 360 may disable certain functions deemed inappropriate or unsafe if no GPS signal is received by the GPS processor 220 and the Enabling Circuit 250. Therefore, the Enabling System 360 that enables the enabled state of the Mobile Communicator 370 may not be subject to blocking systems or other workarounds being developed, such as disablement of the microphone 275, because blocking the microphone 275 in the Mobile Communicator 370 may enable the Default Disabled State.

At present the loss of communicators that rely on satisfying a security requirement to be disabled may result in the owner being exposed to the risks of unauthorized use delineated above. The Mobile Communicator 370 of the present invention may eliminate that risk without adversely impacting convenience or the ability to make emergency calls immediately.

In emergency situations the Mobile Communicator 370 of the present invention not only provides for less likelihood of operator error due to emergency, but also provides for a way to locate where the emergency call is coming from, since the GPS Receiver 210 may provide a geographic location of the Mobile Communicator 370. The kit 205 or the Mobile Communicator 370 having the Enabling System 360 may be a major improvement over cell phones that do not have the Enabling System 360 because the kit 205 or the Mobile Communicator 370 having the Enabling System 360 may lower risk of deploying emergency personnel to a wrong location, but it also allows emergency personnel to be immediately deployed to where help is required even if the person in need of help is only able to initiate the call due to becoming physically incapacitated or endangered. This approach offers significant improvements over cell phones not equipped with the Enabling System 360 of the present invention. Since at no time does the kit 205 or the Mobile Communicator 370 remain in the Default Disabled State 410 due to lack of GPS signal or inaudible sound(s). In emergency situations the kit 205 or the Mobile Communicator 370 can have audible receiving and transmitting functions 680 without concern of a stray signal or occurrence unintentionally disabling it as is possible with cell phones without the Enabling System 360 of the present invention. In an emergency situation, where time is of the essence, not having to try and push buttons will result not only in time savings but eliminate mistakes due to panic.

Figure 2:
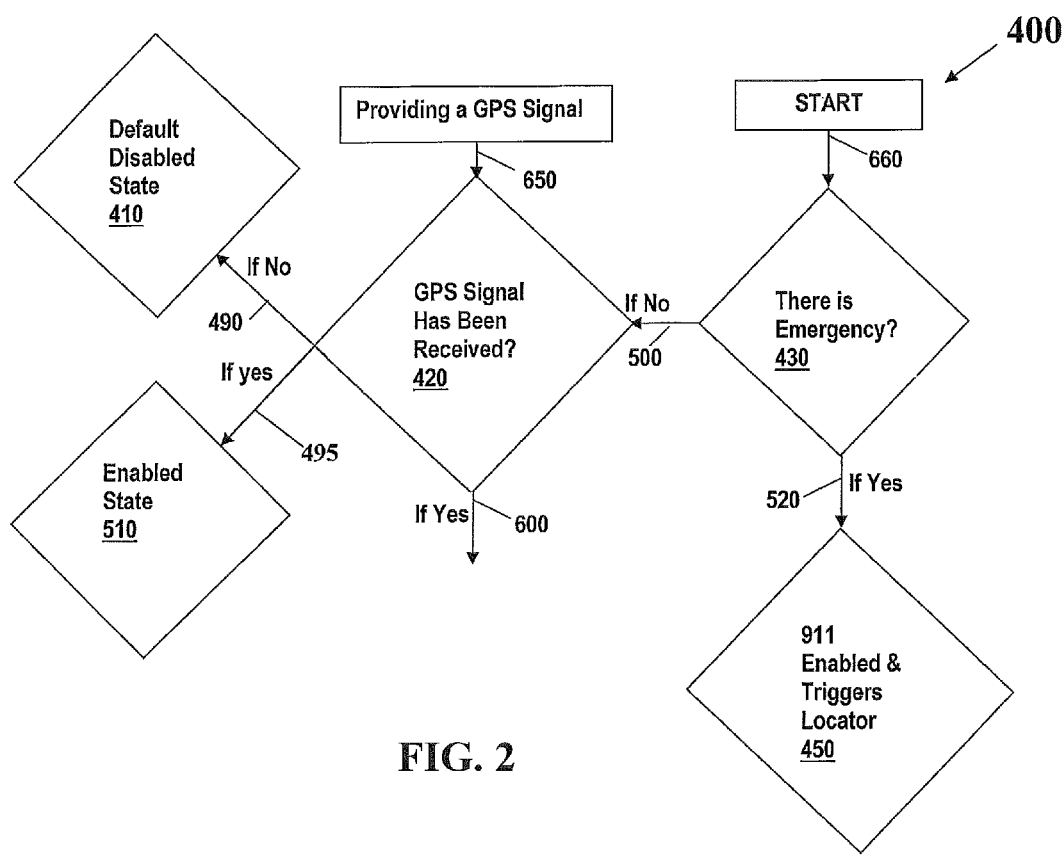
FIGS. 2-7 depict embodiments of method(s) for using the kit and the Mobile Communicator, in accordance with embodiments of the present invention.

FIG. 2 depicts embodiments of a method 400 for enabling the Mobile Communicator 370 using the Enabling System 360 to enable the kit 205, the Mobile Communicator 370 or similar communication device. In a step 650 of the method 400, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 650 of the method 400, said receiving of the GPS signal may be an at least one condition 420 for enabling the kit 205 or the Mobile Communicator 370, and wherein outgoing calls to an Emergency Service Provider 180 are always enabled by the Enabling System 360. The Enabling Circuit 250 may enable calls from the kit 205 or the Mobile Communicator 370 to the Emergency Service Provider 180 by providing a contact closure that completes an electrical circuit in the Enabling Circuit 250 that may notify the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 660 of the method 400, a user may activate the Start Switch 203 on the kit 205 or the Mobile Communicator 370 that may enable the call to the Emergency Service Provider 180 and/or the Location Transmitter 270 of the kit 205 or the Mobile Communicator 370, if an at least one condition, e.g., that there is an emergency, has been satisfied. In the step 660, a logic of the Enabling Circuit 250 of the Enabling System 360 of the kit 205 or the Mobile Communicator 370 asks "There is an Emergency?" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 660 "Start", to a 911 Enabled & Locator Triggered state 450 because such a word or command or input satisfies the at least one condition that there be an emergency, i.e. as in step 590 of the method 400. Hereinafter, a user calling or speaking a preprogrammed word, e.g., "help", or phrase, e.g., "this is an emergency", or "get help", into the Microphone 275 or inputting the preprogrammed word or phrase into the Communicator Controller 370 via the keypad 240 may signify there is an emergency and satisfies the condition that there be an emergency. In the step 590, the Enabling Circuit 250 may provide a contact closure that completes an electrical circuit in which the Enabling Circuit 250 notifies the Communicator Controller 350 via a wire 225, or wirelessly, that there has been an emergency. The Communicator Controller 350 may then trigger the Emergency Dialer 260 to call 911 and the Location Transmitter 270 to trigger the Locator Beacon 213.

In the methods 400, 450, and 465 described infra, the Start Switch 203 may be the contact closure, providing a contact closure to the Communicator Controller 350, via the wire 201, or wirelessly and completing an electrical circuit that may include the Communicator Controller 350 and at least one other component of the Enabling System 360, such as the Enabling Circuit 250, via the wire 225, or wirelessly, the Emergency Dialer 260, via the wire 235, or wirelessly, or the Location Transmitter 270, via the wire 255, or wirelessly. Completing the electrical circuit may enable the Communicator Controller 350 to change the state of the kit 205 or the Mobile Communicator 370 from a Default Disabled State 410 to an Enabled State 510, and to drive the receiving or transmitting functions of the kit 205 or the Mobile Communicator 370 depending that certain conditions 420, 430, 440, 450, 460, and 480 (420-480) may be satisfied. That the conditions 420-480 have been satisfied for the Mobile Communicator 370 may be periodically ascertained by a logic contained in the Enabling Circuit 250 of the Enabling System 360 as "yes, the condition has been satisfied, as in 495, 515, 525, 570, 575, 580, 590, 600, 707, 775, 790, 795, 797, 807, 875, 895, and 897. Alternatively, not satisfying the conditions 420-480 for the Mobile Communicator 370 may be periodically ascertained by a logic contained in the Enabling Circuit 250 of the Enabling System 360 as "no, the condition has not been satisfied, as in 490, 500, 510, 520, 530, 700, 730, 790, 800, 830, and 890. The answers to questions 495, 515, 525, 570, 575, 580, 590, 600, 707, 775, 790, 795, 797, 807, 875, 895, and 897, and 490, 500, 510, 520, 530, 700, 730, 790, 800, 830, and 890 may be provided periodically by the Enabling Circuit 250 via a connection wire 225, or wirelessly, to the Communicator Controller 350. Hereinafter, the process by which the Enabling Circuit 250 arrives at the answers to questions 495, 515, 525, 570, 575, 580, 590, 600, 707, 775, 790, 795, 797, 807, 875, 895, and 897, and 490, 500, 510, 520, 530, 700, 730, 790, 800, 830, and 890 is the Enabling Circuit Logic. An example of the Enabling Circuit Logic is periodically ascertaining that the conditions 420-480 exist for the Mobile Communicator 370, as in embodiments of the methods 400, 450 and 465, infra. Hereinafter periodically means at a prescribed frequency. In embodiments of the methods 400, 450 and 465, infra, if the answer to questions querying the conditions 420-480 are "Yes," then the state of the Mobile Communicator 370 may become the Enabled State 510, as in steps 495, 515, 525, 570, 575, 580, 590, 600, 707, 775, 790, 795, 797, 807, 875, 895, and 897. Alternatively, if the answers to questions querying the conditions 420-480 are "No," then the Mobile Communicator 370 may become a Default Disabled State 410, as in steps 490, 500, 510, 520, 530, 700, 730, 790, 800, 830, and 890. Periodic querying that the conditions 420-480 have been satisfied enables the Mobile Communicator 370 to alternate between states 510 and 410, depending on the length of time of the period. In embodiments of the methods 400, 450, and 465 the Enabling Circuit 250 may perform periodic querying that the conditions 420-480 have been satisfied for periods from about a second to about a minute. In the methods 400, 450, and 465, the Enabling Circuit 250 may perform periodic querying that the conditions 420-480 have been satisfied for periods from about 0.01 seconds to about 0.1 minutes. In the methods 400, 450, and 465, the Enabling Circuit 250 may perform periodic querying that the conditions 420-480 have been satisfied for periods from about 0.001 seconds to about 0.01 minutes.

In the method 400, if it may be ascertained, as in step 500 of the method 400, that there is no emergency, changing the kit 205 or the Mobile Communicator 370 from the initial Default Disabled State 410 to the Enabled State 510 may depend on satisfying a condition 420, i.e., "GPS signal has been received?". Hereinafter, enabling the transmitting and audible receiving functions 680 of the Mobile Communicator 370 is equivalent to changing the Mobile Communicator 370 from a Default Disabled State to an Enabled State. In a step 650, of the method 400, a GPS signal has been received by the GPS Signal Amplifier 190. In the step 650, if the GPS Processor 220 receives the GPS signal from the GPS Signal Amplifier 190, the GPS Receiver 210 may provide the GPS signal or a processed signal to the Enabling Circuit 250. The Enabling Circuit 250 may provide a contact closure that completes an electrical circuit in which the Enabling Circuit 250 notifies the Communicator Controller 350 via a wire 225, or wirelessly, that the GPS signal has been provided to the Enabling Circuit 250. Receiving the GPS signal, as in the step 660 of the method 400, by the GPS Receiver 210 and/or notice that the GPS signal has been received by the Communicator Controller 250 of the Mobile Communicator 370 may be an at least one condition for enabling the kit 205 or the Mobile Communicator 370, wherein outgoing calls from the Emergency Dialer 260 to an Emergency Service Provider 180 are always enabled by the Communication Controller 350. Hereinafter, references in this discussion to Mobile Communicator 370, mobile phone, cell phone, or mobile communication device are intended to refer to the encompassing meaning of a cell phone and/or mobile communication device under certain enabling conditions, wherein the Mobile Communicator 370 may default to the Disabled State 410 unless the at least one aforementioned conditions 420-480 are satisfied, and wherein that outgoing calls from the Emergency Dialer 260 to an Emergency Service Provider 180 and/or from the Location Transmitter 270 are always enabled by the Communication Controller 350.

In the step 495 of the method 400, if the Enabling System 360 of the kit 205 or the Mobile Communicator 370 determines that the condition 420 may be satisfied, i.e., that a GPS signal has been received and/or the Communicator Controller 350 has been notified that the GPS signal has been received by the Enabling Circuit 250, then the Enabling System 360 may enable an Enabled State 510 of the kit 205 or the Mobile Communicator 370, as in the step 495 of the method 400.

Alternatively, in the step 490 of the method 400, if the Enabling Circuit 250 of the kit 205 or the Mobile Communicator 370 determines, conversely, that the condition 420 has not been satisfied, i.e., that no GPS signal has been received by the Enabling Circuit 250, and/or the Communicator Controller 350 has not been notified that the GPS signal has been received by the Enabling Circuit 250, then the Enabling System 360 may enable a Default Disabled State 410 of the Mobile Communicator 370, as in the step 490 of the method 400.

Figure 3:
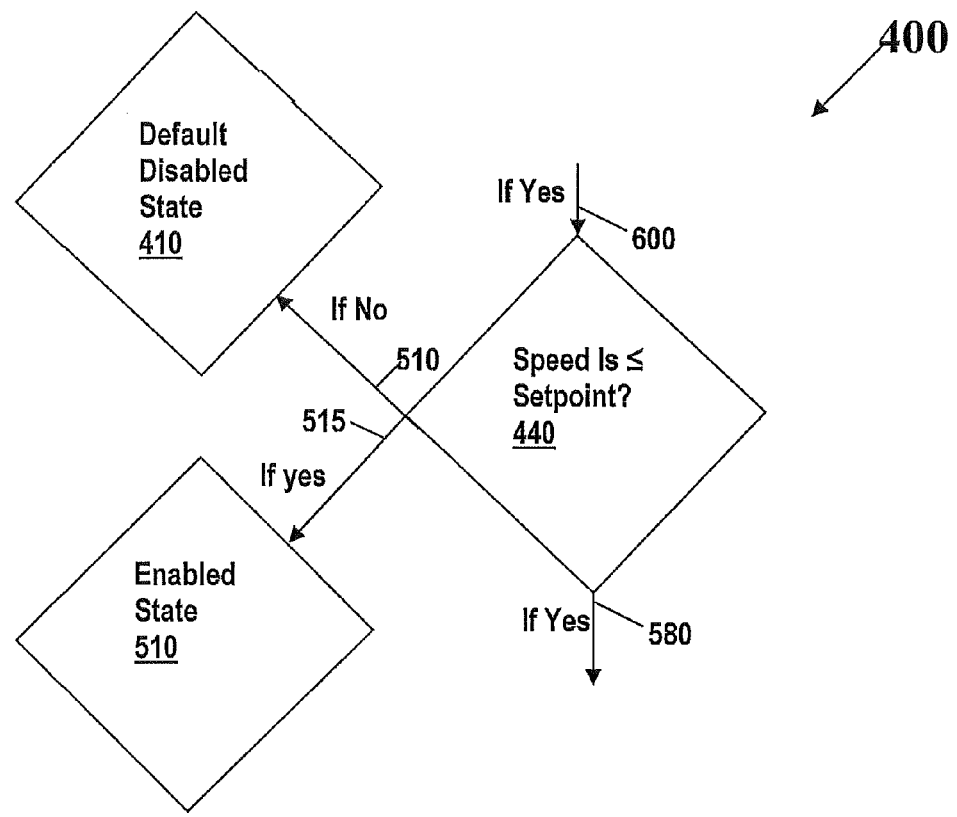

FIG. 3 depicts a continuation of FIG. 2, depicting embodiments of the method 400. If the Enabling System 360 has ascertained, as in the step 500 of the method 400, as depicted in FIG. 2 and described in associated text herein, that there is no emergency, and that a GPS signal has been received, in the step 600, instead of enabling the Mobile Communicator 370, as in the step 495, the Enabling System 360 may require that a condition 440, i.e., that a speed, $s_{f,i}$, of the Mobile Communicator 370, an average speed, $s_{avg}$, of the Mobile Communicator 370, or a normalized speed, ns, of the Mobile Communicator 370, may be less than or equal to ("≦") a setpoint speed. Hereinafter, "speed of the kit 205 or the Mobile Communicator 370" refers to each speed selected from the group consisting of the speed, $s_{f,i}$, of the kit 205 or the Mobile Communicator 370, an average speed, $s_{avg}$, of the kit 205 or the Mobile Communicator 370, or a normalized speed, ns, of the kit 205 or the Mobile Communicator 370.

A motion detector 228, such as a laser doppler non-contact speed and length gauge (Proton Products, 10 Aylesbury End, Beaconsfield, Bucks.HP9 LW1, England), may determine if the Mobile Communicator 370 may be in motion. Photo radar systems usually operate on the K-band at 24.15 GHz. The motion detector 228 may measure a speed of a vehicle in which the kit 205, or the Mobile Communicator 370 is used, using any appropriate speedometer typically used to determine the speed of a vehicle. The output from the speedometer may be provided to the Motion Detector 228 by the vehicle's speedometer 279 via mechanical, electrical signal, hydraulic or pneumatic means through a conduit or wire 272, or wirelessly.

IR Pulsed Laser Diode, available from Ingram Technologies, LLC, Rt 2, Box 2169, 6721 West, 4000 South Roosevelt, Utah 84066, to measure speed, distance and direction is the new generation replacement for the older Photo-Radar systems. By using beam width of less than one-degree, an accuracy level is achieved that can not be reached by the older radar systems. As the beam crosses the traffic lanes, it can only target one vehicle at a time and minimize the possibility of false readings. The beam can also be "gated" so that only vehicles within a set of distances will be read. The other feature of IR Pulsed Laser Diode is that a vehicle traveling in only one direction can be captured by the system, if desired.

The speed, $s_{f,i}$, of the kit 205 or the Mobile Communicator 370 may be determined by the GPS processor 220, such as a GPSTran (available from 5 Little Balmer, Buckingham Industrial Park, Buckingham MK18 1TF, United Kingdom), designed to provide a digital speed pulse output for use by other equipment. Because satellite GPS is used to measure speed, the GPSTran is suitable for use in many applications where normal speed sensing methods will not work. The update rate of the pulse output is 5 Hz with an accuracy of ±0.1 kmh. The pulse per meter setting is configurable to suit most applications.

The GPS Processor 220 may provide an initial $p_i$ and a final $p_f$ geographical position of the GPS Processor 220 for an initial time $t_i$ and a final time $t_f$, wherein a difference $(t_f - t_i)$ between the initial and final times $t_i$, $t_f$ represent a time interval, $x_{f,i}$, wherein $x_{f,i}$ may be any postive integer. Alternatively, the time interval $x_{f,i}$, may be from about 1 mili second to about $1 \times 10^3$ mili seconds. Alternatively, the time interval, $x_{f,i}$, may be from about 1 micro second to about $1 \times 10^6$ micro seconds. Alternatively, the time interval, $x_{f,i}$, may be from about 1 nano second to about $1 \times 10^9$ nano seconds. The time interval, $x_{f,i}$, may be from about 1 minute to about 5 minutes and a difference between the initial geographical position $p_i$ of the GPS Processor 220 and the final geographical position $p_f$ of the GPS Processor 220 may be from about 0.016 miles to about 2.5 miles. The speed, $s_{f,i}$, of the Mobile Communicator 370 may be represented by formula 1, as follows:

$$s_{f,i} = (p_f - p_i)/x_{f,i} \qquad \text{Formula 1}$$

The average speed, $s_{avg}$, of the Mobile Communicator 370, for a time interval, $x_j$, wherein j=1, 2, 3, . . . j, may be determined by the GPS processor 220, wherein the GPS Processor 220 may provide an initial geographical position, $p_i$, and a final geographical position, $p_f$, of the GPS Processor 220 for each time interval, $x_j$, and an initial time $t_i$ and a final time $t_f$ for each time interval, $x_j$, wherein a sum of the differences $\Sigma(t_f - t_i)_j$ for each initial and final time, $t_i$, $t_f$ for each time interval, $x_j$, may be represented as a sum of the time intervals, $\Sigma x_j$. A sum of the differences $\Sigma(p_f-p_i)_k$, where k=1, 2, 3, ... k, between the initial and final geographical positions $p_i$, $p_f$, may represent a total distance that the kit 205 or the Mobile Communicator 370 may have traveled in each time interval $x_j$. The average speed, $s_{avg}$, of the Mobile Communicator 370 may be represented by formula 2, as follows:

$$s_{avg}=\Sigma(p_f-p_i)_j/\Sigma x_j \qquad \text{Formula 2}$$

The normalized speed, ns of the Mobile Communicator 370, for a time interval, $x_m$, where m=1, 2, ... m, determined by the GPS processor 220, wherein the GPS Processor 220 may provide an initial speed $s_i$ of the Mobile Communicator 370, and a fraction of time at the initial speed $s_i$, and a final speed, $s_f$, of the Mobile Communicator 370, and fraction of time at the final speed, $s_f$. The time, $t_{si}$, may be the time at speed $s_i$ and the time $t_{sf}$ may be the time at speed $s_f$. Therefore, the fraction of time at the first speed $s_i$ may be represented as $t_{si}/(t_{si}+t_{sf})$. In like manner, the fraction of time at the second speed $s_f$ may be represented as $t_{sf}/(t_{si}+t_{sf})$. The GPS processor 220 may calculate the normalized speed, ns, of the Mobile Communicator 370 as in the following Formula 3:

$$ns=s_i\times\text{fraction of time at }s_i+s_f\times\text{fraction of time at }s_f \qquad \text{Formula 3}$$

A logic of the Enabling Circuit 250 may provide a contact closure that completes an electrical circuit in which the Enabling Circuit 250 notifies the Communicator Controller 350 via a wire 225, or wirelessly, that the Motion Detector 228 has provided confirmation that the speed of the kit 205 or the Mobile Communicator 370 is ≦the setpoint speed to the Enabling Circuit 250 via wire 229, or wirelessly, based on the Motion Detector 228 receiving a speed of the kit 205 or the Mobile Communicator 370 from the speedometer 279 via a wire 272, or wirelessly. Said completion of the electrical circuit and confirmation that the speed of the kit 205 or the Mobile Communicator 370 is ≦the setpoint speed to the Enabling Circuit 250 via a wire 223, or wirelessly, may be the at least one condition for enabling the Enabling System 360 of the kit 205 or the Mobile Communicator 370, and wherein outgoing calls from the Emergency Dialer 260 to an Emergency Service Provider 180 may always be enabled by the Communication Controller 350.

In the step 515 of the method 400, if the Enabling System 360 of the kit 205 or the Mobile Communicator 370 determines that the condition 440 may be satisfied, i.e., that the Mobile Communicator 370 speed may be ≦the setpoint, then the Enabling System 360 may enable an Enabled State 510 of the Mobile Communicator 370, as in the step 515 of the method 400.

Alternatively, in the step 510 of the method 400, if the Enabling System 360 of the kit 205 or the Mobile Communicator 370 determines, conversely, that the condition 440 may not be satisfied, i.e., that the Mobile Communicator 370 speed not be ≦the setpoint speed, then the Enabling System 360 may enable a Default Disabled State 410 of the Mobile Communicator 370, as in the step 510 of the method 400.

Figure 4:
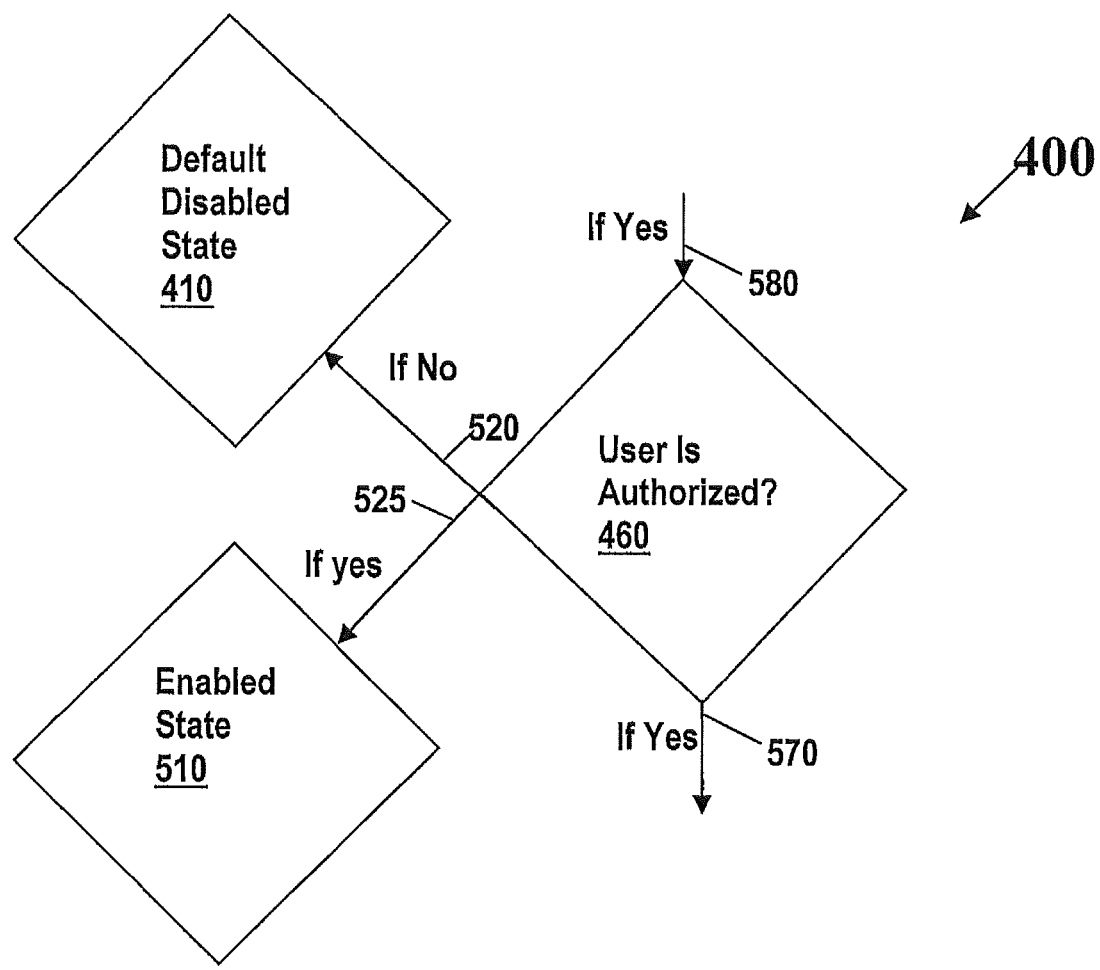

FIG. 4 depicts a continuation of FIG. 3, depicting embodiments of the method 400. If the Enabling System 360 has ascertained as in the step 500 of the method 400, as depicted in FIG. 2 and described in associated text herein, that there is no emergency, and that the GPS signal has been received, in the step 580, instead of enabling the Mobile Communicator 370, as in the step 515, the Enabling System 360 may require that a condition 460, i.e. that a user of the kit 205 or the Mobile Communicator 370 be authorized. In the step 580, if the voice recognition system 230 receives a user identifying sound(s) such as a user's identifying voice or identifying frequency or tone (hereinafter user-identifying sound(s) from the microphone 275. If the user identifying sound(s) match or have the same frequencies as a preprogrammed voice or preprogrammed frequency, the voice recognition system 230 may provide confirmation of voice recognition to the Enabling Circuit 250. The preprogrammed user identifying sound(s) may be in a frequency range that may be audible or inaudible to humans. For example, a dog whistle may emit sound(s) that may be inaudible to humans. Humans hear frequencies between about 20 cycles/sec to 20,000 cycles/sec at 130 db (very loud). This shrinks to a range of about 700 cycles/sec to 6000 cycles/sec at 0 db (very faint).

Alternatively, the user identifying sound(s) may be a tone from a tuning fork that naturally resonates at an established frequency or set of frequencies, i.e., sound(s), such as the note C in the key of C major that is equivalent to middle C on a standard piano, may be audible to humans.

A logic of the Enabling Circuit 250 may provide a contact closure that completes an electrical circuit in which the Enabling Circuit 250 notifies the Communicator Controller 350 via a wire 225, or wirelessly, that the Voice Recognition System 230 has provided confirmation of the voice recognition to the Enabling Circuit 250 via wire 223, or wirelessly. Said completion of the electrical circuit and confirmation of the voice recognition to the Enabling Circuit 250 via a wire 223, or wirelessly, may be the at least one condition for enabling the Enabling System 360 of the kit 205 or the Mobile Communicator 370, and wherein that outgoing calls from the Emergency Dialer 260 to an Emergency Service Provider 180 may always be enabled by the Communication Controller 350.

In the step 525 of the method 400, if the Enabling System 360 of the kit 205 or the Mobile Communicator 370 determines that the condition 460 may be satisfied, i.e., that the user has been authorized, then the Enabling System 360 may enable the Enabled State 510 of the Mobile Communicator 370, as in the step 525 of the method 400.

Alternatively, in the step 520 of the method 400, if the Enabling System 360 of the kit 205 or the Mobile Communicator 370 determines, conversely, that the condition 460 may not be satisfied, i.e., that the user has not been authorized, then the Enabling System 360 may enable a Default Disabled State 410 of the Mobile Communicator 370, as in the step 520 of the method 400.

Figure 5:
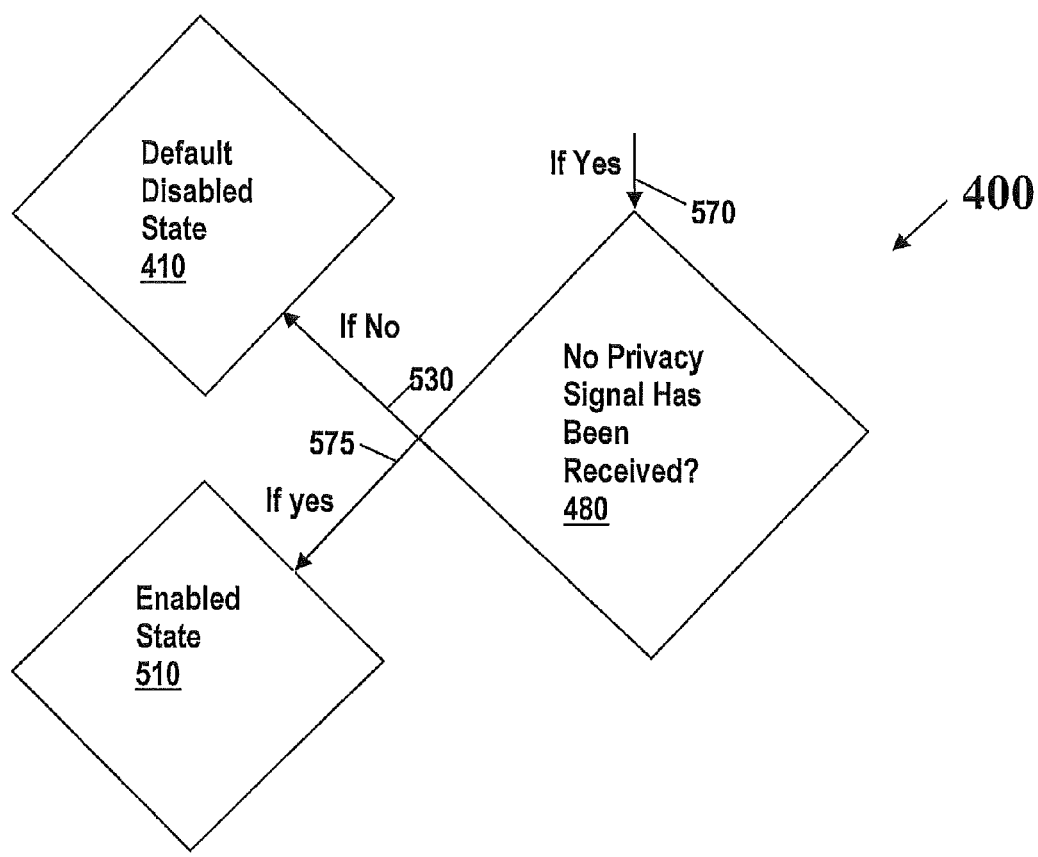

FIG. 5 depicts embodiments of a method 400 for enabling the Mobile Communicator 370 using the Enabling System 360 to enable the kit 205, the Mobile Communicator 370 or similar communication device. If the Enabling System 360 has ascertained as in the step 500 of the method 400, as depicted in FIG. 2 and described in associated text herein, that there is no emergency and that the GPS signal has been received, in the step 570, instead of enabling the Mobile Communicator 370, as in the step 525, the Enabling System 360 may require that a condition 480, i.e. "No Privacy Signal Has Been Received", be satisfied, so that the Enabling Circuit 250 may communicate to the Communicator Controller 350 to drive audible receiving and transmitting functions 680, thereby enabling the Enabled State 510 of the kit 205 or the Mobile Communicator 370.

In the step 570, if the Privacy Receiver System 273 receives a privacy signal from the Privacy Signal Generator 271, the Privacy Receiver System 273 may provide the privacy signal or a processed signal to the Enabling Circuit 250. In the step 570, the Enabling System 360 may or may not receive a privacy signal. A logic of the Enabling Circuit 250 may determine that the condition 480, i.e., "No Privacy Signal Has Been Received?", has been satisfied, as in step 575 or is not satisfied, as in the step 530. If the condition 480 has not been satisfied, as in the step 530, i.e., a privacy signal has been received, e.g., when privacy is desirable or when piracy of trade secrets, for example, is to be discouraged, the Enabling Circuit 250 communicates that the condition 480 has not been satisfied to the Communicator Controller 350. Alternatively, if the condition 480 has been satisfied, i.e. no privacy signal may have been detected by the Privacy Signal Receive System 273, as in the step 575, the Communicator Controller 350 may enable the Enabled State 510 and the phone becomes enabled.

A purpose of defeating or working around the privacy signal condition 480 may be to make an outgoing phone call. Embodiments in which enabling the Enabled State 510 of the kit 205 or the Mobile Communicator 370 may be conditioned on satisfying the condition 480, i.e. that No Privacy Signal Has Been Received, may be an improvement over cell phones that require a privacy signal for enablement because no privacy signal may be needed to enable the Enabled State 510 of the kit 205 or the Mobile Communicator 370. Conditioning enablement of the kit 205 or the Mobile Communicator 370 on satisfying the condition 480, i.e. that No Privacy Signal Has Been Received, may be an improvement over cell phones that require a privacy signal for enablement because a user seeking to block the privacy signal that disables the kit 205 or Mobile Communicator 370 must also block the Microphone 275, thus defeating the ability to make the outgoing call because both the user's voice and the privacy signal may be received by the Microphone 275 in order for the user to make the outgoing call.

In the enabled Default Disabled State 410, the receiving or transmitting functions of the kit 205 or the Mobile Communicator 370 may remain disabled, even though the Start Switch 203 has been activated in the step 660 of the method 400, as depicted in FIG. 2, and described in associated text, herein. Conditioning disablement of the kit 205 or the Mobile Communicator 370 on receiving the privacy signal through the Microphone 275 instead of through wire 268 or wirelessly from the antenna 274 of the Privacy Signal Generator 278 may avoid the majority of the privacy and piracy (theft of trade secrets or business confidential information) issues because audible receiving and transmitting functions 680 of the kit 205 or the Mobile Communicator 370 may remain in the Default Disabled State 410 unless the Enabling System 360 of the kit 205 or the Mobile Communicator 370 does not receive the privacy signal. Alternatively, privacy and piracy incidents may be avoided during indoor usage of the kit 205 or the Mobile Communicator 370 since the GPS signal also may not be available due to indoor blocking of the line of sight to the source of the GPS signal, such as a GPS satellite. Transmitting and receiving functions of the kit 205 and the Mobile Communicator 370 my remain disabled because the at least one condition for enabling the Enabling System 360 of the kit 205 or the Mobile Communicator 370, i.e., receiving a GPS signal, has not been satisfied, and wherein that outgoing calls from the Emergency Dialer 260 to an Emergency Service Provider 180 may always be enabled by the Communication Controller 350. During indoor usage, if a GPS signal has not been received by the GPS Receiver 210, the Default Disabled State 410 of the kit 205 or the Mobile Communicator 370 may be enabled as in the step 490 of the method 400. In the unlikely situation a GPS signal is available in a building (GPS typically requires line of sight to work) and the owner/occupants wish to disable phones in this area this can be done by the installation of a wide range of inexpensive and readily available blocking devices that will allow them to create a no GPS signal area. For example, a Cell-Block-R Control Unit, available from Quiet Cell Technologies Inc., 57 Waterford Drive, Ottawa ON K2E 7V4: CANADA, may act as a kind of decoy cellular tower. Where its use may no be prohibited, the Cell-Block-R Control Unit may remove the kit 205 or the Mobile Communicator 370 from a regular cell phone service provider by supplying a decoy communication signal. Any incoming calls may be referred to voice mail.

In the method 400 for using the kit 205 or the Mobile Communicator 370, a logic of the Enabling Circuit 250 may condition enablement of the Enabled State 510 on the Enabled Circuit 250 not receiving the privacy signal or processed privacy signal from the Privacy Signal Receiver 273 via Microphone 275. Conditioning enabling the Enabled State 510 on the Enabled Circuit 250 on not receiving the privacy signal or processed privacy signal from the Privacy Signal Receiver 273 via the Microphone 275 will also prevent most usage of the Mobile Communicator 370 in ground passenger vehicles or carriers such as cars, trucks, trains, buses and the like, or in airplanes if use of the kit 205 or the Mobile Communicator 370 may interfere with the passengers enjoyment of their quiet and solitude or if trade secrets, confidential or proprietary information may be improperly disclosed because the privacy signal could be provided when it may be improper to use the Mobile Communicator 370 in such vehicles or carriers. When prevention of indoor use of the kit 205 or the Mobile Communicator 370 is desired, and the kit 205 or the Mobile Communicator 370 has received a GPS signal from, for example, the antenna 271 being in the line of sight of the GPS signal from the GPS satellite, a Privacy Signal Generator 278 may provide a privacy signal to the Privacy Receiver System 273 for indoor enablement of the Default Disabled State 410 of the kit 205 or the Mobile Communicator 370, as in the step 530 of the method 400. Any appropriate system for enhancing the GPS signal may be used to provide the GPS signal to the GPS Receiver 210 during indoor or other applications where the GPS antenna 271 may not be in the line of sight of the GPS signal from the GPS Satellite.

In the method 400 for using the kit 205 or the Mobile Communicator 370, a logic of the Enabling Circuit 250 may provide a contact closure that completes an electrical circuit in which the Enabling Circuit 250 notifies the Communicator Controller 350 via a wire 225, or wirelessly, that the Enabling Circuit 250 may not have received the privacy signal or a processed privacy signal from the Privacy Receiver System 273 via the wire 241, or wirelessly. Said completion of the electrical circuit and confirmation of notice to the Communicator Controller 350 by the Enabling Circuit 250 via a wire 225, or wirelessly, may be the at least one condition for enabling the kit 205 or the Mobile Communicator 370, and wherein outgoing calls from the Emergency Dialer 260 to an Emergency Service Provider 180 may always be enabled by the Communication Controller 350.

It has been stated that the Enabling System 360 of the kit 205 or the Mobile Communicator 370 may be an improvement over mobile communicators that may be disabled by receiving a disabling signal because the disabling signal of such devices may be blocked or interfered with or they may fail, leaving the mobile communicator in an Enabled State because that is the default state when the disabling signal is not received. Conversely, the Enabling System 360 may be an improvement because the default state of the Mobile Communicator 370 may be a Default Disabled State 410 because the kit 205 or the Mobile Communicator 370 may be disabled if the GPS Signal Amplifier 190 does not receive a GPS signal, as in the step 490 of the method 400, as described in FIG. 2 and associated text, supra.

The GPS signal may be any standard GPS signal. GPS satellites transmit two low power radio signals, designated L1 and L2. Civilian GPS uses the L1 frequency of 1575.42 MHz in the UHF band. The signals travel by line of sight, meaning they will pass through clouds, glass and plastic but will not go through most solid objects such as buildings and mountains. In the step 650, the Enabling System 360 may or may not receive a GPS signal. The logic of the Enabling Circuit 250 may determine that the condition 420, i.e., "GPS signal has been received?", is satisfied, as in step 495 or is not satisfied, as in the step 490. If no GPS signal is available (typically indoors or in most vehicles), the Enabling Circuit 250 communicates that the condition 420 is satisfied to the Communicator Controller 350. If the GPS signal is not detected, as in the step 490, the Communicator Controller 350 may enable the Default Disabled State 410 and the Mobile Communicator 370 remains disabled. This embodiment is an improvement over cell phones not having the Enabling System 360 in that if for any reason (intentional or unintentional) the GPS signal is not available in the step 650, the Mobile Communicator 370 stays in its default disabled mode 410.

Conditioning enablement of the Mobile Communicator 370 on receiving the GPS signal, instead of conditioning disablement on receiving a disabling signal, as in cell phones not having the Enabling System 360, may avoid the majority of the privacy and piracy (theft of trade secrets or business confidential information) issues, since privacy and piracy issues arise mostly in indoor usage of the Mobile Communicator 370, where the GPS signal usually is not available. In the unlikely situation a GPS signal is available in a building (GPS typically requires line of sight to work) and the owner/occupants wish to disable phones in this area this can be done by the installation of a wide range of cheap and readily available blocking materials that will allow them to create a privacy area. This feature will also prevent most usage in cars and airplanes where it would be a safety hazard because a GPS signal is most often not available in cars or airplanes. When indoor use of the Mobile Communicator 370 is desired, an antenna 271 may provide a GPS signal to the GPS Signal Amplifier 190 for indoor enablement of the Mobile Communicator 370. Alternatively, the antenna 271 may provide better reception for the GPS Signal Amplifier 190 than an internal antenna with which most GPS Receivers 210 may be equipped.

Referring to FIG. 2, although there are unlimited applications for the Enabling System 360, the inventor of the present invention submits the following three embodiments for employing the method 400 and the Enabling System 360, as depicted in FIG. 1, supra, to enable the states 410, 450, and/or 510 of the Mobile Communicator 370.

In Example 1, if the Enabling System 360 of the kit 205 or the Mobile Communicator 370 determines that the condition 440 may be satisfied, i.e., that the Mobile Communicator 370 speed may be ≦the setpoint, then transmitting and audible receiving functions 680 of the Mobile Communicator 370 may be enabled, as described in Example 1, as follows.

EXAMPLE 1

Enabling the Kit 205 or the Mobile Communicator 370 in a Moving Vehicle

Referring to FIG. 2, and associated text, herein, in a step 650 of the method 400 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that a GPS signal has been received by GPS Signal Amplifier 190 may be transmitted by the GPS Signal Amplifier 190 to the Enabling Circuit 250 via connection wire 243, or wirelessly. The GPS signal from the GPS Processor 220 may be digital or analog. In the step 650 of the method 400, said receiving of the GPS signal may be an at least one condition 420 for enabling the kit 205 or the Mobile Communicator 370, and wherein outgoing calls to an Emergency Service Provider 180 may always be enabled by the Enabling System 360. The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 660 of the method 400, a user may activate the "Start Switch" 203 on the kit 205 or the Mobile Communicator 370 that may enable the call to the Emergency Service Provider 180 and/or the Location Transmitter 270 of the kit 205 or the Mobile Communicator 370, if an at least one condition, e.g., that there is an emergency, has been satisfied. In the step 660, a logic of the Enabling Circuit 250 of the Enabling System 360 of the kit 205 or the Mobile Communicator 370 asks "There Is an Emergency?" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 660 "Start", to a 911 Enabled & Locator Triggered state 450 because such a word or command or input satisfies the at least one condition that there be an emergency, i.e. as in step 590 of the method 400. In the step 590, the Enabling Circuit 250 may provide a contact closure that completes an electrical circuit in which the Enabling Circuit 250 notifies the Communicator Controller 350 via a wire 225, or wirelessly that may trigger the Emergency Dialer 260 to call 911 and the Location Transmitter 270 to trigger the Locator Beacon 213.

Referring to FIG. 3 and described in associated text herein, if the Enabling System 360 has ascertained as in the step 500 of the method 400, as depicted in FIG. 2 and described in associated text herein, that there is no emergency, and that a GPS signal has been received, in the step 600, instead of enabling the Mobile Communicator 370, as in the step 495, the Enabling System 360 may enable audible receiving and transmitting functions 680 of the kit 205 or the Mobile Communicator 370 if a condition 440, i.e., that a speed, $s_{f,i}$, of the Mobile Communicator 370, an average speed, $s_{avg}$, of the Mobile Communicator 370, or a normalized speed, ns, of the Mobile Communicator 370, may be less than or equal to ("≦") a setpoint speed, wherein the setpoint may be a maximum speed such as any speed from about 0 to about 10 mph. Alternatively, the setpoint may be from about 0 to about 30 mph. It has been found that only enabling Mobile Communicator 370, e.g., cell phone, use in moving vehicles when the vehicles are moving at a speed ≦the setpoint may be a major public safety need that may be advanced by use of the kit 205 or the Mobile Communicator 370 and the Enabling System 360, in accordance with the method 400.

Transmitting and audible receiving functions 680 of the Kit 205 or the Mobile Communicator 370 may be enabled when the condition 480, i.e., that no privacy signal has been received by the Privacy Receiver System 273 has been satisfied, as described in Example 2, as follows.

EXAMPLE 2

Enabling the Kit 205 or the Mobile Communicator 370 when Privacy or Security May Be an Issue When Privacy or Security May be an Issue a method 450 for enabling the Mobile Communicator 370 using the Enabling System 360 to enable the kit 205, the Mobile Communicator 370 or similar communication device. In a step 750 of the method 450 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 750 of the method 450, said receiving of the GPS signal may be an at least one condition 420 for enabling the kit 205 or the Mobile Communicator 370, and wherein outgoing calls to an Emergency Service Provider 180 may always be enabled by the Enabling System 360.

The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 760 of the method 450, a user may activate the "Start Switch" 203 on the kit 205 or the Mobile Communicator 370 that may enable the transmitting and receiving functions of the kit 205 or the Mobile Communicator 370, if an at least one condition, e.g., that there is an emergency, has been satisfied. In the step 760, a logic of the Enabling Circuit 250 of the Enabling System 360 of the kit 205 or the Mobile Communicator 370 asks "There is an Emergency?" 430. In the step 797, if the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 760 "Start", to a 911 Enabled & Locator Triggered state 450 because such a word or command or input satisfies the at least one condition that there be an emergency, i.e. as in step 790 of the method 450. In the step 797, the Enabling Circuit 250 may provide a contact closure that completes an electrical circuit in which the Enabling Circuit 250 notifies the Communicator Controller 350, via a wire 225, or wirelessly, that may trigger the Emergency Dialer 260 to call 911 and the Location Transmitter 270 to trigger the Locator Beacon 213.

Alternatively, if there is no emergency, as in the step 700 of the method 450, the audible receiving and transmitting functions 680 of the kit 205 or the Mobile Communicator 370 may be enabled, as in the step 795, if the Enabling System 360 of the kit 205 or the Mobile Communicator 370 determines that the condition 420 may be satisfied, i.e., that a GPS signal has been received. In the step 795, the Enabling Circuit 250 notifies the Communicator Controller 350 that the GPS signal has been received from the GPS Receiver 210. The Enabling Circuit 250 may provide a contact closure that completes an electrical circuit in which the Enabling Circuit 250 notifies the Communicator Controller 350, via a wire 225, or wirelessly, that the GPS signal has been provided to the Enabling Circuit 250. In the step 795, the Enabling System 360 may enable the audible receiving and transmitting functions 680 of the kit 205 or the Mobile Communicator 370 by changing the state of the kit 205 or the Mobile Communicator 370 from the Default Disabled State 410 to the Enabled State 510.

Alternatively, in the step 790 of the method 450, the Enabling Circuit 250 of the kit 205 or the Mobile Communicator 370 has determined, conversely, that the condition 420 has not been satisfied, i.e., that no GPS signal has been received by the Enabling Circuit 250. In the step 790, the state of the kit 205 or the Mobile Communicator 370 remains in the Default Disabled State 410 so audible receiving and transmitting functions 680 of the kit 205 or the Mobile Communicator 370 may not be enabled.

In the steps 795 and 790, a logic of the Enabling Circuit 250 may determine that the condition 420, i.e., "GPS signal has been received?", has been satisfied, as in step 795 or is not satisfied, as in the step 790. In the step 790, if no GPS signal has been received, e.g., when the GPS signal is not in line of sight of the GPS Signal Amplifier 190, e.g., when the GPS Signal Amplifier 190 may be indoors in a building, automobile, or airplane, the Enabling Circuit 250 communicates that the condition 420 has not been satisfied to the Communicator Controller 350. If no GPS signal may be detected, as in the step 790, the Communicator Controller 350 may enable the Default Disabled State 410 and the Mobile Communicator 370, e.g., the cell phone, remains disabled.

Figure 6:
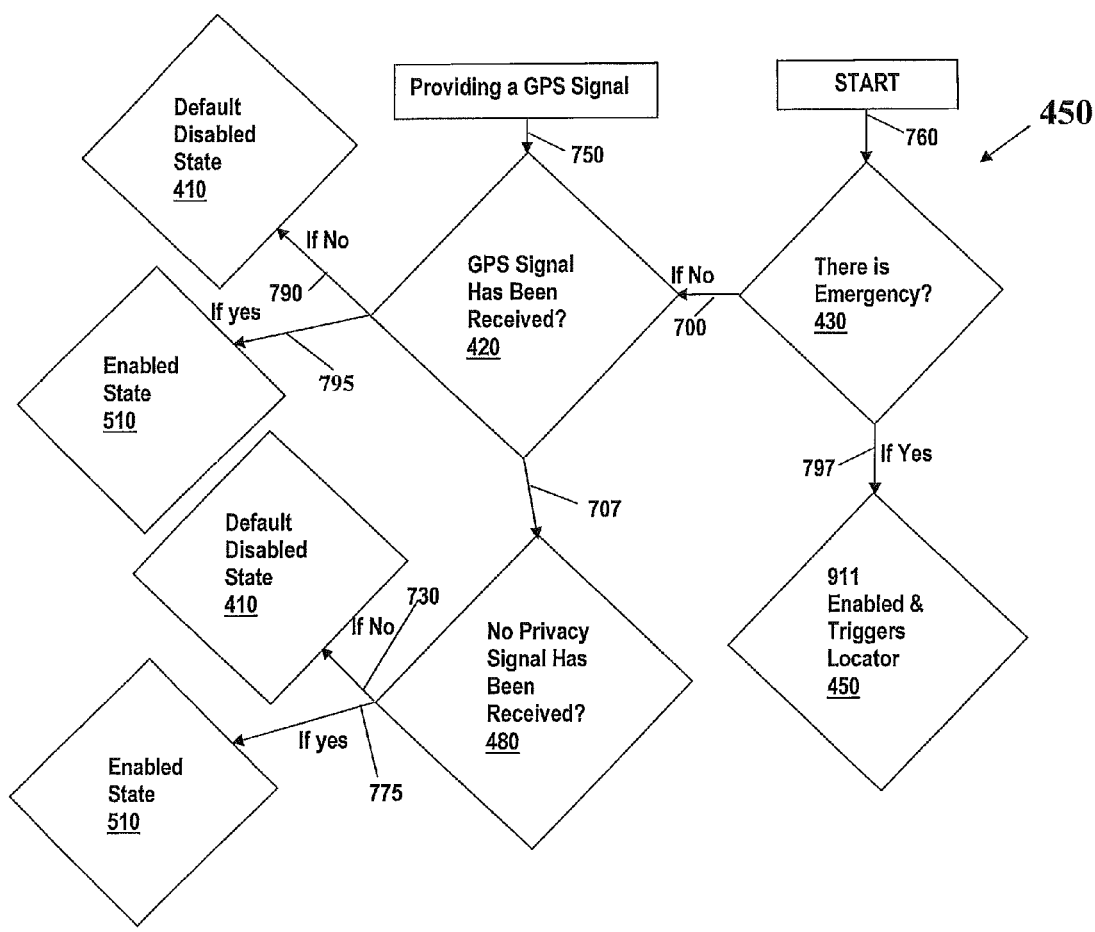

Referring to FIG. 6, if the Enabling System 360 has ascertained as in the step 700 of the method 450, that there is no emergency, and that the GPS signal has been received, in the step 707, instead of enabling the Mobile Communicator 370, as in the step 795, the Enabling System 360 may require that a condition 480, i.e. that the Privacy Receiver System 273 of the kit 205 or the Mobile Communicator 370 has not received a privacy signal.

In the step 707 of the method 450, the Enabling System 360 may or may not receive a privacy signal. In the step 707, if the Privacy Receiver System 273 receives a privacy signal from the Privacy Signal Generator 271, the Privacy Receiver System 273 may provide the privacy signal or a processed signal to the Enabling Circuit 250. A logic of the Enabling Circuit 250 may determine that the condition 480, i.e., "No Privacy Signal Has Been Received?", has not been satisfied, as in step 730 of the method 450. If a privacy signal has been received, e.g., when privacy is desirable or when piracy of trade secrets, for example, is to be discouraged, the Enabling Circuit 250 communicates that the condition 480 has not been satisfied to the Communicator Controller 350.

Alternatively, if no privacy signal may be detected, as in the step 775 of the method 450, the Communicator Controller 350 may enable the Enabled State 510 and the audible receiving and transmitting functions 680 of the Mobile Communicator 370, e.g., a cell phone, may be enabled. Examples of areas where kit 205 or the Mobile Communicator 370 use may be appropriate, safe, or not a security risk include airplanes before takeoff, non-private places outside doctor's offices, outside locker rooms, outside sensitive corporate or private public buildings, outside theatres, and the like.

Examples of areas where kit 205 or Mobile Communicator 370 use may be appropriate, safe, or not a security risk include any public or private place that for privacy or safety reasons needs to have kit 205 or Mobile Communicator 370, e.g., cell phone, usage controlled.

Alternatively, if a privacy signal has been not been received, e.g., when privacy is not needed or when use of the kit 205 or the Mobile Communicator 370, for example, may be encouraged, the Enabling Circuit 250 communicates that the condition 480 has been satisfied to the Communicator Controller 350. If the privacy signal may not be detected, as in the step 775, the Communicator Controller 350 may enable the Enabled State 510 and the audible receiving and transmitting functions 680 of the Mobile Communicator 370, e.g., the cell phone, may be enabled.

Transmitting and audible receiving functions 680 of the Kit 205 or the Mobile Communicator 370 may be enabled when the condition 460, i.e., that the user has been confirmed by the Voice Recognition System 230 has been satisfied, as described in Example 3, as follows.

EXAMPLE 3

Figure 7:
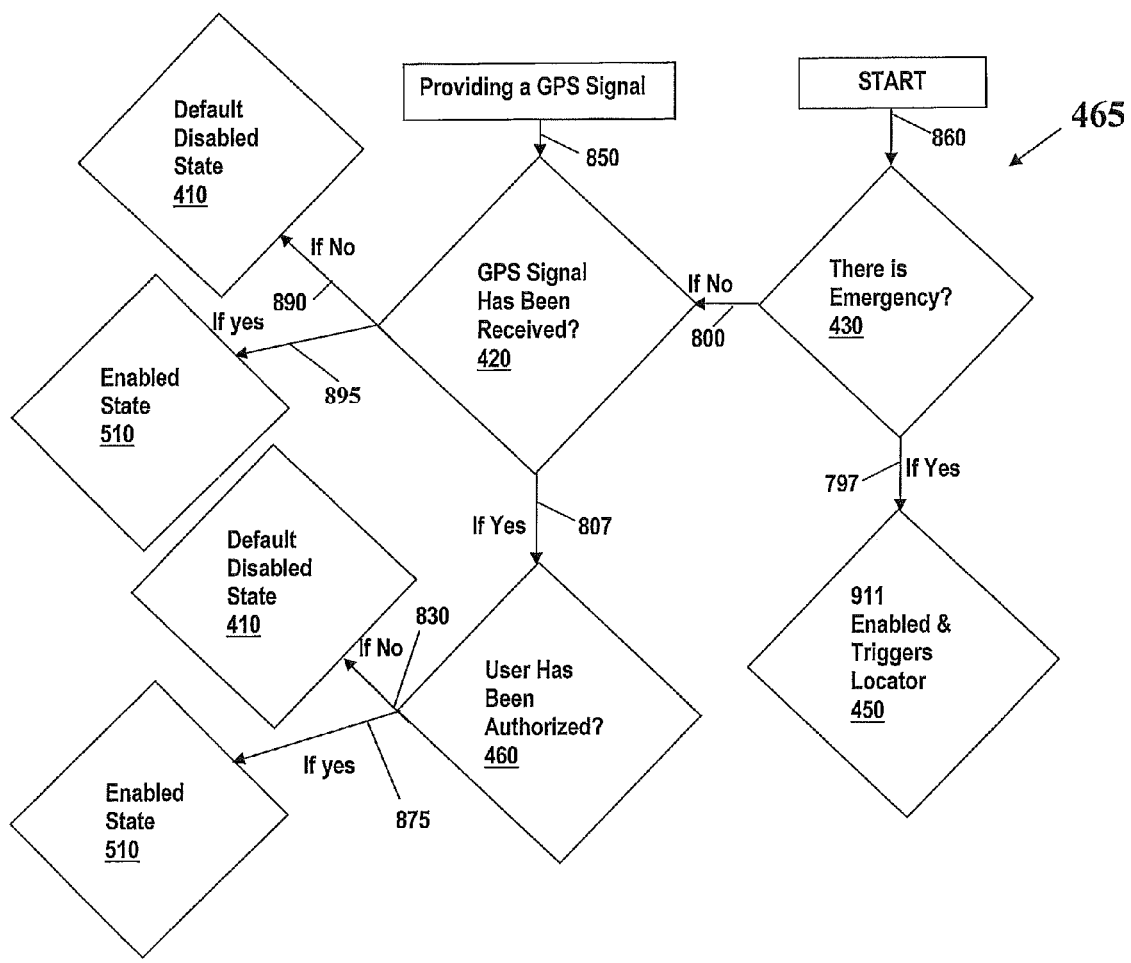

Enabling the Kit 205 or the Mobile Communicator 370 when User Authorization May Be an Issue FIG. 7 depicts embodiments of a method 465 for enabling the Mobile Communicator 370 using the Enabling System 360 to enable the kit 205, the Mobile Communicator 370 or similar communication device. In a step 850 of the method 465 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 850 of the method 465, said receiving of the GPS signal may be an at least one condition 420 for enabling the kit 205 or the Mobile Communicator 370, and wherein outgoing calls to an Emergency Service Provider 180 may always be enabled by the Enabling System 360.

The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 860 of the method 465, a user may activate the "Start Switch" 203 on the kit 205 or the Mobile Communicator 370 that may enable the transmitting and receiving functions of the kit 205 or the Mobile Communicator 370, if an at least one condition, e.g., that there is an emergency, has been satisfied. In the step 860, a logic of the Enabling Circuit 250 of the Enabling System 360 of the kit 205 or the Mobile Communicator 370 asks "Is There an Emergency" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 860 "Start", to a 911 Enabled & Locator Triggered state 450 because such a word or command or input satisfies the at least one condition that there be an emergency, i.e. as in step 797 of the method 465. In the step 797, the Enabling Circuit 250 may provide a contact closure that completes an electrical circuit in which the Enabling Circuit 250 notifies the Communicator Controller 350, via a wire 225, or wirelessly, that may trigger the Emergency Dialer 260 to call 911 and the Location Transmitter 270 to trigger the Locator Beacon 213.

Alternatively, if there is no emergency, as in the step 800 of the method 465, the audible receiving and transmitting functions 680 of the kit 205 or the Mobile Communicator 370 may be enabled, as in the step 895, if the Enabling System 360 of the kit 205 or the Mobile Communicator 370 determines that the condition 420 may be satisfied, i.e., that a GPS signal has been received. In the step 895, the Enabling Circuit 250 notifies the Communicator Controller 350 that the GPS signal has been received from the GPS Receiver 210. The Enabling Circuit 250 may provide a contact closure that completes an electrical circuit in which the Enabling Circuit 250 notifies the Communicator Controller 350, via a wire 225, or wirelessly, that the GPS signal has been provided to the Enabling Circuit 250. In the step 895, the Enabling System 360 may enable the audible receiving and transmitting functions 680 of the kit 205 or the Mobile Communicator 370 by changing the state of the kit 205 or the Mobile Communicator 370 from the Default Disabled State 410 to the Enabled State 510.

Alternatively, in the step 890 of the method 465, the Enabling Circuit 250 of the kit 205 or the Mobile Communicator 370 has determined, conversely, that the condition 420 has not been satisfied, i.e., that no GPS signal has been received by the Enabling Circuit 250. In the step 890, the state of the kit 205 or the Mobile Communicator 370 remains in the Default Disabled State 410 so audible receiving and transmitting functions 680 of the kit 205 or the Mobile Communicator 370 may not be enabled.

In the steps 895 and 890, a logic of the Enabling Circuit 250 may determine that the condition 420, i.e., "GPS signal has been received?", has been satisfied, as in step 895 or is not satisfied, as in the step 890. In the step 890, if no GPS signal has been received, e.g., when the GPS signal is not in line of sight of the GPS Signal Amplifier 190, e.g., when the GPS Signal Amplifier 190 may be indoors in a building, automobile, or airplane, the Enabling Circuit 250 communicates that the condition 420 has not been satisfied to the Communicator Controller 350. If no GPS signal may be detected, as in the step 890, the Communicator Controller 350 may enable the Default Disabled State 410 and the Mobile Communicator 370, e.g., the cell phone, remains disabled.

Referring to FIG. 7, if the Enabling System 360 has ascertained as in the step 800 of the method 465, that there is no emergency, and that the GPS signal has been received, in the step 807, instead of enabling the Mobile Communicator 370, as in the step 895, the Enabling System 360 may require that a condition 460, i.e. that a user of the kit 205 or the Mobile Communicator 370 be authorized or authenticated. In the step 807, if the voice recognition system 230 receives a user's identifying voice or identifying frequency or tone (hereinafter user-identifying sound(s)) from the microphone 275, that matches a preprogrammed voice or preprogrammed frequency that has been preprogrammed into the Enabling System 360, the voice recognition system 230 may provide confirmation of voice recognition to the Enabling Circuit 250. Hereinafter, "authorizing a user" or "authenticating a user" describes a designed property or function of the Voice Recognition System's 230 to determine (ascertain) that a user's identifying voice or identifying frequency or tone (hereinafter user-identifying sound(s) from the microphone 275), matches the preprogrammed voice or preprogrammed frequency or sound(s) or passwords that have been preprogrammed into the Enabling System 360. The preprogrammed sound(s) may be in a frequency range that may be audible or inaudible to humans. For example, a dog whistle may emit sound(s) that may be inaudible to humans. Humans hear frequencies between about 20 cycles/sec to 20,000 cycles/sec at 130 db (very loud). This shrinks to a range of about 700 cycles/sec to 6000 cycles/sec at 0 db (very faint).

Alternatively, a tone from a tuning fork that naturally resonates at an established frequency or set of frequencies, i.e., sound(s), such as the note C in the key of C major that is equivalent to middle C on a standard piano, may be audible to humans.

In the step 807, a logic of the Enabling Circuit 250 may provide a contact closure that completes an electrical circuit in which the Enabling Circuit 250 notifies the Communicator Controller 350, via a wire 225, or wirelessly, that the Voice Recognition System 230 has provided confirmation of the voice recognition to the Enabling Circuit 250 via wire 223, or wirelessly. Said completion of the electrical circuit and confirmation of the voice recognition to the Enabling Circuit 250 via a wire 223, or wirelessly, may be the at least one condition for enabling the Enabling System 360 of the kit 205 or the Mobile Communicator 370, and wherein that outgoing calls from the Emergency Dialer 260 to an Emergency Service Provider 180 may always be enabled by the Communication Controller 350. In the step 807, the Enabling System 360 may or may not receive a privacy signal. The logic of the Enabling Circuit 250 may determine that the condition 460, i.e. that a user of the kit 205 or the Mobile Communicator 370 be authorized, has been satisfied, as in step 875 or is not satisfied, as in the step 830. If no confirmation from the Voice Recognition System 230 has been received by the Enabling Circuit 250, e.g., when the user is not authorized, such as when the user is using the kit 205 or the Mobile Communicator 370 without permission or when the user's voice, sound(s) or password may not be authenticated, the Enabling Circuit 250 communicates that the condition 460 has not been satisfied to the Communicator Controller 350. If no confirmation from the Voice Recognition System 230 may be received by the Enabling Circuit 250, as in the step 830, the Communicator Controller 350 may enable the Default Disabled State 410 and the Mobile Communicator 370, e.g., the cell phone, remains disabled.

Alternatively, if confirmation from the Voice Recognition System 360 has been received, e.g., when audible receiving and transmitting functions 680 of the kit 205 or the Mobile Communicator 370, for example, may be authorized, the Enabling Circuit 250 communicates that the condition 480 has been satisfied to the Communicator Controller 350. If the confirmation from the Voice Recognition System 360 has been received, as in the step 875, the Communicator Controller 350 may enable the Enabled State 510 and the audible receiving and transmitting functions 680 of the Mobile Communicator 370, e.g., the cell phone, may be enabled.

In the method 465, in the step 875, outgoing call to the Emergency Service Provider may be authenticated by the Voice Recognition System 230. In the method 465, in the step 875, the Voice Recognition System 230 may recognize each sound selected from the group of sounds consisting of sounds audible to a human ear and sounds inaudible to a human ear. In the method 465, in the step 875, entry of a password or authentication by voice recognition may provide identification of the user to the Emergency Service Provider and triggering the Locator Beacon.

Unauthorized use of the kit 205 or the Mobile Communicator 370, e.g., the cell phone, may be undesirable for two reasons: A) unauthorized use may result in unauthorized charges to an authorized user's charge account with a provider of the kit 205 or the Mobile Communicator 370, e.g., the provider of the cell phone; and B) unauthorized use may result in unauthorized access to the authorized user's personal calling lists, that may include respective names and phone numbers of persons on the list who may want to limit access by others to their names and phone numbers, such as by the unauthorized user. Unauthorized use of the kit 205 or the Mobile Communicator 370, e.g., the cell phone, may result in unauthorized access to the authorized user's secured information, such as, for example, passwords, personal identification numbers (PIN) and the like. As a number of types of secured information stored in the kit 205 or the Mobile Communicator 370, e.g., the cell phone increases, unauthorized access to the secured information stored in the kit 205 or the Mobile Communicator 370, e.g., the cell phone may become a concern. An example of the increased number of secured information types may be a politician's or corporate executive's stored confidential phone numbers and other like secured information. A purpose of embodiments of the present invention may be to protect the owner of the kit 205 or the Mobile Communicator 370, e.g., the cell phone from an unauthorized user accessing the secured information if their phone were lost or stolen as well as providing features that would aid in recovering the kit 205 or the Mobile Communicator 370.

Figure 8:
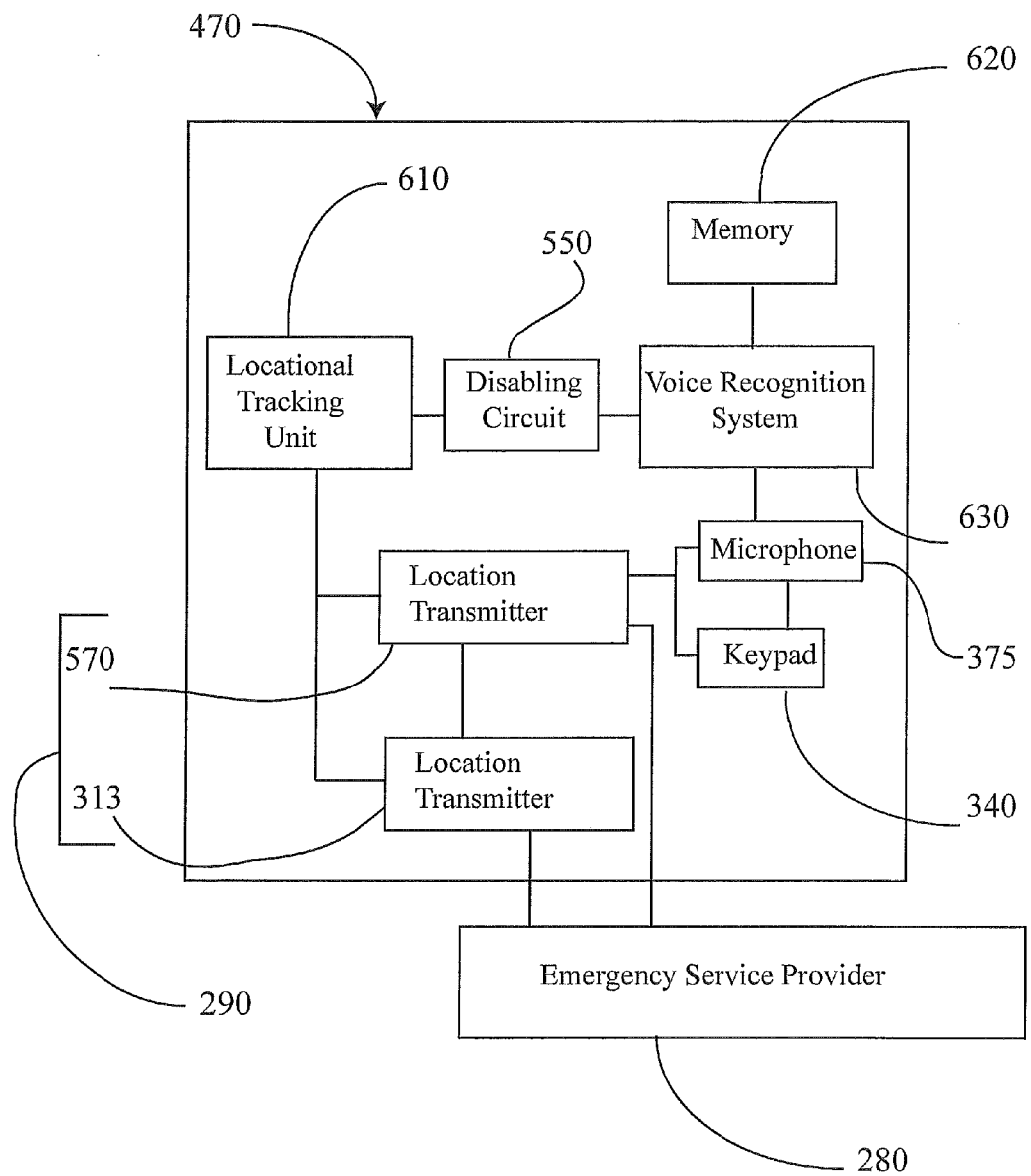
FIG. 8 is a view of an embodiment of the mobile communicator apparatus of the present invention.
Figure 9:
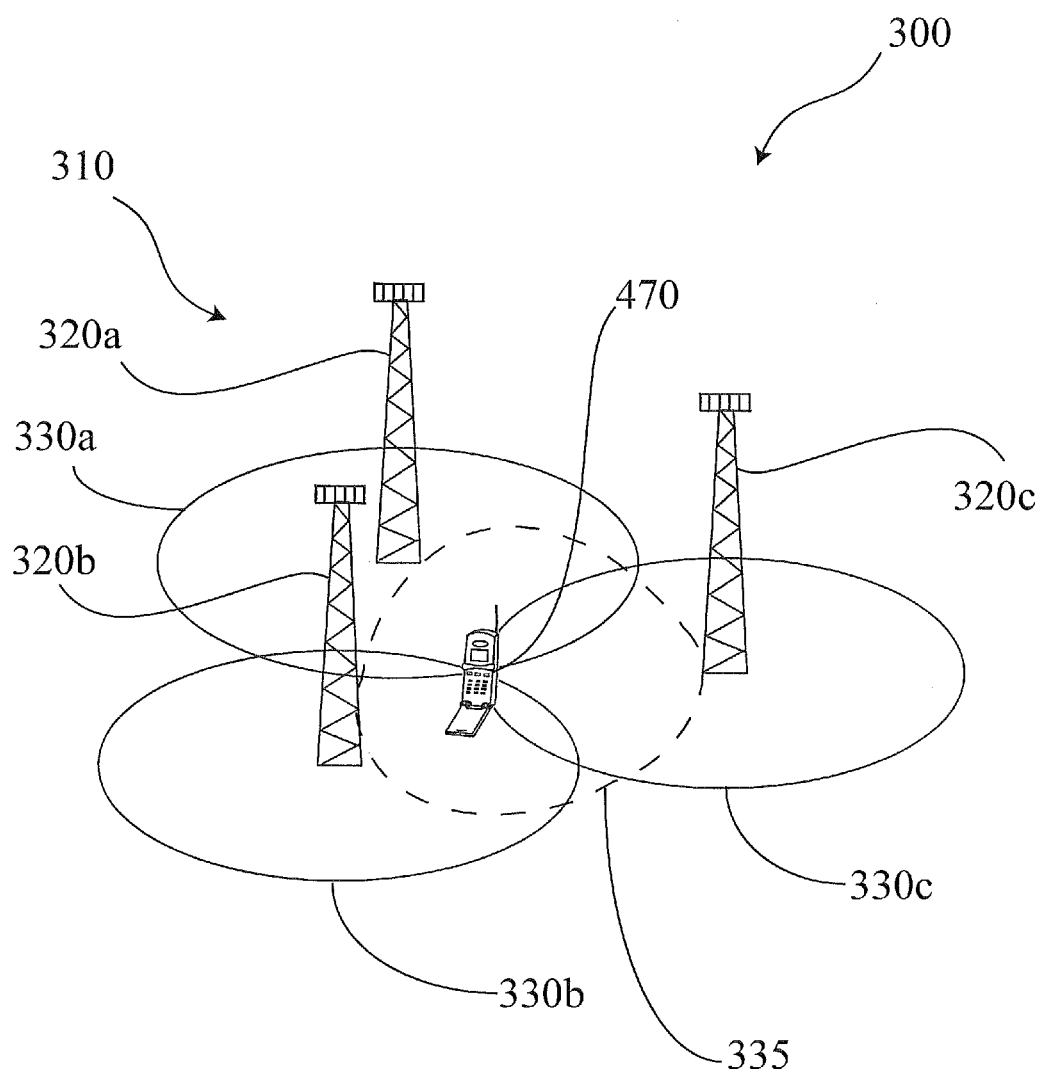
FIG. 9 is a view of an embodiment of the mobile communicator disabling system, in accordance with the present invention.

Referring to FIG. 8. and FIG. 9, an embodiment of the present invention may comprise a mobile communicator apparatus 470, wherein the mobile communicator 470 may include a locational tracking unit 610, a disabling circuit 550, a microphone 375, a voice recognition system 630, a memory storage device 620, a keypad 340, and an emergency service system 290. The emergency service system 290 may further include a location transmitter 570 and a locator beacon 313. The locational tracking unit 610 of the mobile communicator apparatus 470 may utilize a network of signal transceivers 310 to determine the location of the mobile communicator 470.

Referring to FIG. 9, the network of signal transceivers 310 may comprise of a number of signal transceivers, such as cell towers 320 a-c. A cell tower 320 a-c is a wireless communications station installed at a fixed and known location that transmits and receives signals to and from mobile communicators 470. Those of ordinary skill in the art may interpret a base station, a cell site, a mobile phone mast, or various other terms to mean a cell tower 320 a-c for these purposes. The cell towers 320 a-c may transmit signals 330 a-c in a radially outward direction to the mobile communicator 470. Moreover, the cell towers 320 a-c may receive signal 335 transmitted from the mobile communicator 470. The location of the mobile communicator 470 may be tracked by the intersection cell tower signals 330 a-c.

Although FIG. 9 provides three cell towers 320 a-c in the network of signal transceivers, the network of signal transceivers 310 may comprise additional cell towers 320 a-c. The more cell towers 320 a-c the network 310 is comprised of, the more accurate the tracking of the location of the mobile communicator 470.

As in FIG. 8, the mobile communicator apparatus may contain a locational tracking unit 610 that utilizes the surrounding network of signal transceivers 310 to determine the location of the mobile communicator 470. The locational tracking unit 610 may be positioned within the mobile communicator 470. The locational tracking unit 610 may be connected to the disabling circuit 550. The disabling circuit 550 may comprise a logic circuit that performs non-arithmetic operations including, but not limited to: OR, AND, NOR, NAND, and NOT. The disabling circuit 550 may disable the mobile communicator apparatus if the at least one condition is satisfied. In this embodiment, the at least one condition may comprise either: 1) receiving a privacy signal; or 2) determining speed of the mobile communicator 470 to be greater than a pre-determined setpoint. The setpoint may be a speed determined by state or federal law.

A privacy signal may be received by the mobile communicator 470 in certain locations that prohibit the transmission and retrieval of signals through the mobile communicator 470 for specific reasons. Some locations that may require the disablement of a mobile communicator 470 may include a theater, a sports tournament, a hospital, a church, a waiting room, a library, a locker room, a classroom, a vehicle, a business area that houses trade secrets and/or confidential information, or a conference room in which trade secrets or confidential proprietary information are discussed. A vehicle may be any transportation device that carries passengers, such as, but not limited to, an airplane, an automobile, or a seat on a train. Also, in the case of a terrorist situation or any other situation dealing with national defense, a privacy signal may be executed according to protocol dependent upon security levels ascertained by an entity. Regardless, a location that may require the disablement of a mobile communicator 470 may be any area in which privacy and/or silence may be desired Referring further to FIG. 8, the mobile communicator apparatus 470 may contain a microphone 375 for inputting a voice, sound(s), and/or passwords into the mobile communicator 470. The microphone 375 may be any device that operates as an acoustic to electric transducer or sensor. That is, the microphone 375 may be any device that converts sound signals into electrical signals. The mobile communicator apparatus 470 may also contain a voice recognition system 630 and a memory storage device 620. The voice recognition system 630 may be configured to be connected to the microphone 375 so that the voice, sound(s), and/or password inputted into the microphone 375 can be authenticated by the voice recognition system 630 by determining each sound(s) provided by the user match a pre-programmed or user-recorded identifying sound stored in the memory storage device 620. The mobile communicator apparatus 470 may further contain a keypad 340 configured to allow a user to input alphanumeric combinations such as, but not limited to, passwords, names, phone numbers, and text messages into the mobile communicator 470.

The mobile communicator apparatus 470 may also comprise an emergency service system 290. The emergency service system 290 may include a location transmitter 570 and a locator beacon 313. The location transmitter 570 may be configured to transmit the location of the mobile communicator 470 to the emergency service provider 280, while the locator beacon 313 is connected to the location transmitter 570 and is configured to emit a locator signal, such as an alarm, a flashing light, or an audible sound, as to the geographic location of the mobile communicator. The locational tracking unit 610 may be connected to the location transmitter 570 and the locator beacon 313 in order to provide the components of the emergency service system 290 with the location of the mobile communicator 470. The location transmitter 570 and the locator beacon 313 may further be connected to an emergency service provider 280. Therefore, the location of the mobile communicator 470 may be transmitted to the emergency service provider 280 in an emergency and a locator beacon 313 may be emitted to aid the emergency service provider 280 in locating the user in an emergency.

Another embodiment of the present invention is related to a mobile communicator disabling system 300, as illustrated in FIG. 9. The mobile communicator disabling system 300 may comprise a mobile communicator 470 and a network of signal transceivers 310. The mobile communicator 470 may further include a locational tracking unit 610 and a disabling circuit 550. The locational tracking unit 610 may be configured to determine the location of the mobile communicator 470. Moreover, the disabling circuit 550 may be configured to change the state of the mobile communicator 470 from an enabled state, wherein the audible receiving and transmitting functions of the mobile communicator 470 are enabled, to a disabled state, wherein the audible receiving and transmitting functions of the mobile communicator 470 are disabled. The locational tracking unit 610 may use a network of signal transceivers 310 to determine the location of the mobile communicator 470.

Figure 10:
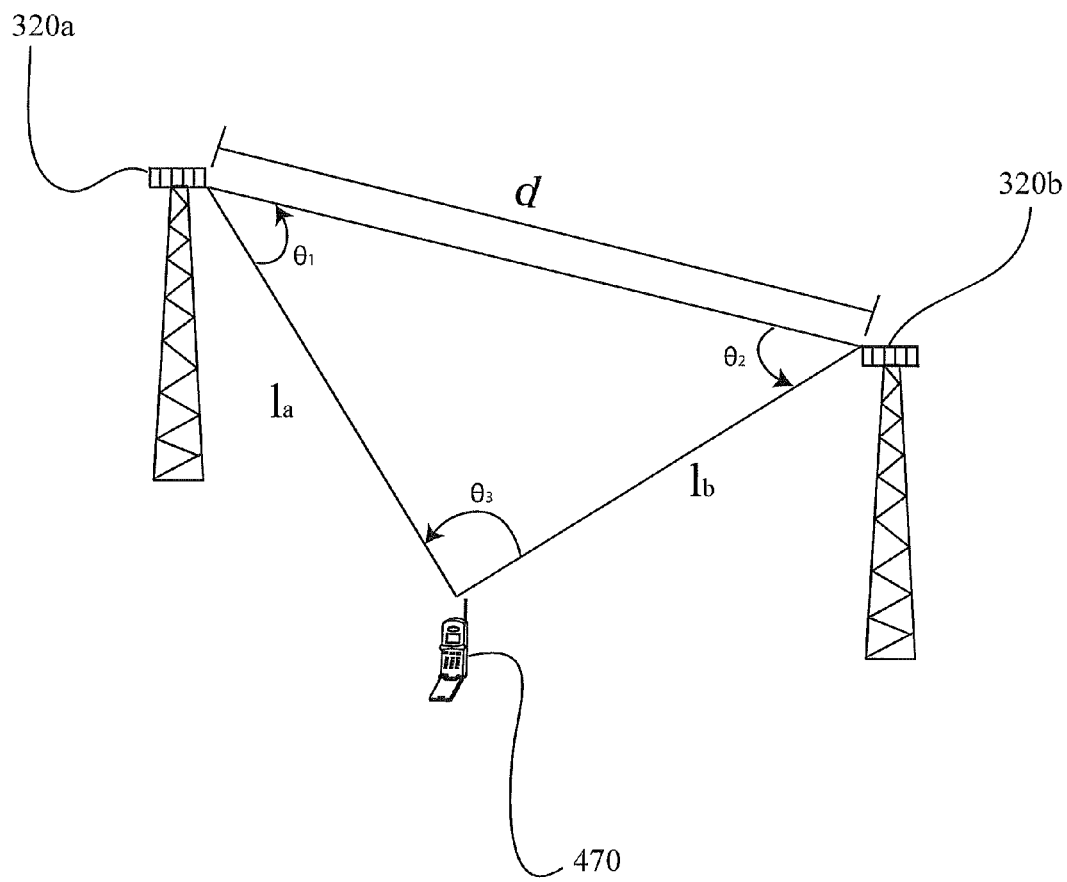
FIG. 10 is a view of a method of determining the location of the mobile communicator, in accordance with the present invention.

As shown in FIG. 10, the locational tracking unit 610 (FIG. 8) of the mobile communicator 470 may communicate with signal transceivers, such as the cell towers 320 $a,b$, to determine the location of the mobile communicator 470 using triangulation. The locational tracking unit 610, of the mobile communicator 470, may determine the incident angle $\theta_1$, $\theta_2$ with cell towers 320$a$, $b$, respectively. The angles $\theta_1$ and $\theta_2$ may be determined by the known technique of Angle of Arrival (AoA). This technique uses the multiple antennas of a cell tower to determine the incident angle of an arriving signal. A second cell tower with the same technology may then also determine the direction of the signal and the incident angle of an arriving signal. AoA systems must be designed to account for multipath signals. Multipath signals occur when a signal bounces off other objects and may confuse the cell tower as to the location of the mobile communicator. The distance d between the cell towers 320$a,b$ is a known distance since the locations of the cell towers 320$a,b$ are fixed and known. The method of triangulation is the process of finding the location of a point, given measurements of various angles and sides of a triangle formed by that point and two other known reference points.

In this example, the point and the two other known reference points are the mobile communicator 470 and the cell towers 320$a,b$, correspondingly. Further, the distance d and the angles $\theta_1$, $\theta_2$ are known. Those with ordinary skill in the art would know that the sum of the three angles in any triangle is 180 degrees. Therefore, since the points of the mobile communicator 470 and the cell towers 320$a,b$ form a triangle, the third angle $\theta_3$ may be 180-$\theta_1$-$\theta_2$. Using various trigonometric identities, the distance $1_a$, $1_b$ between the mobile communicator 470 and the cell towers 320$a,b$ may be determined. Given either of these lengths, the sine and cosine can be used to calculate the offsets in both the north/south and east/west axes from the corresponding observation points at the cell towers 320$a,b$ to the unknown point at the mobile communicator 470. Hence, the location of the mobile communicator 470 will be determined. Further, since the locational tracking unit 610, of the mobile communicator 470, is continually and dynamically tracking the location of the mobile communicator 470 in substantial real time, the speed of the mobile communicator 470 may also be determined by analyzing the change of position over time.

Figure 11:
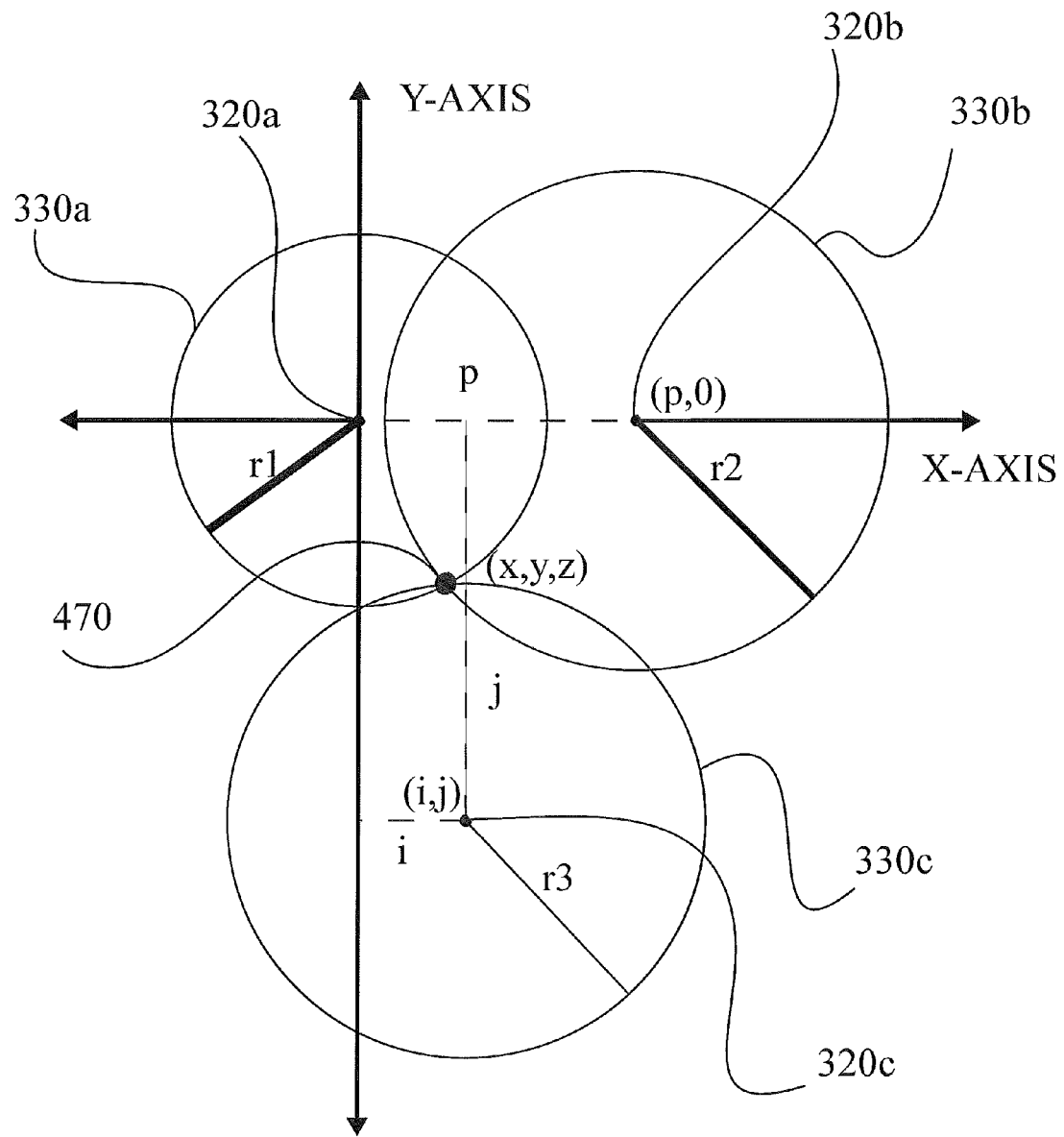
FIG. 11 is a view of an alternative method of determining the location of the mobile communicator, in accordance with the present invention.

In another embodiment of the system 300, the locational tracking unit 610 (FIG. 8) may use the trilateration method as depicted in FIG. 11 to determine the location of the mobile communicator 470. Trilateration is a method of determining the relative position of an object using the geometry of triangles in a similar fashion as triangulation. However, unlike triangulation, which uses angle measurements to calculate an object's location, trilateration uses the known locations of two or more reference points, and the measured distance between the object and each reference point. As shown in FIG. 11, there is a coordinate system of the X and Y axes. The Z axis is not shown as the height in the Z direction is so minimal that it may be approximated to be zero. The location of the mobile communicator 470 is where the cell tower signals 330 *a-c* intersect.

Referring further to FIG. 11, the cell tower 320*a* is located at the origin of the coordinate system. The cell tower 320*b* is located on the X-axis at a distance p away from the origin at cell tower 320*a*. Therefore, cell tower 320*b* has the same y-coordinate as cell tower 320*a*. The cell tower 320*c* is located in the fourth quadrant of the coordinate system, wherein the cell tower 320*c* is a distance i to the right of the Y-axis and a distance j below the X-axis. Although FIG. 11 depicts the mobile communicator system 300 in a specific configuration, the system 300 may comprise many different configurations of the cell towers 320 *a-c* and the mobile communicator 470. Moreover, the mobile communicator disabling system 300 may further comprise additional cell towers 320*a-c* to provide a more accurate calculation of the mobile communicator 470 location.

As shown in FIG. 11, each cell tower 320*a-c* emits a signal 330*a-c* in the shape of a sphere. For purposes of simplicity, FIG. 11 depicts the signals 330*a-c* as circles, rather than sphere; however, the derivation for the location of the mobile communicator 470 will assume the signals 330*a-c* are spheres. Since signals 330*a-c* travel with a known velocity, the distances $r_1$, $r_2$, and $r_3$ from each cell tower 320*a-c* to the mobile communicator 470 may be directly calculated from the time of arrival. The formula for the distance is: d=v*t.

With further reference to FIG. 11, in order to derive the location of the mobile communicator 470, the equations for each signal 330*a-c* sphere may be determined and set equal to one another to calculate the point at which all the signals 330*a-c* intersect. This intersection point is the location of the mobile communicator 470. As previously mentioned, the z-coordinate of the signals 330*a-c* are approximated to be zero. The derivation for the location of the mobile communicator 470 is as followed:

The equation for signal 330*a* is:

$$r_1^2 = x^2 + y^2 + z^2$$

The equation for signal 330*b* is:

$$r_2^2 = (x-p)^2 + y^2 + z^2$$

The equation for signal 330*c* is:

$$r_3^2 = (x-i)^2 + (y-j)^2 + z^2$$

Subtract the equation for signal 330*b* from the equation for signal 330*a*:

$$r_1^2 - r_2^2 = x^2 - (x-p)^2 = 2*x*p - p^2$$

Solve for x:

$$x = \frac{r_1^2 - r_2^2 + p^2}{2*p}$$

Substitute x into the equation for signal 330*a*:

$$r_1^2 = \frac{(r_1^2 - r_2^2 + p^2)^2}{4*p^2} + y^2 + z^2$$

Solving for $y^2+z^2$ and substituting for x:

$$y^2 + z^2 = r_1^2 - \frac{(r_1^2 - r_2^2 + p^2)^2}{4*p^2} = r_1^2 - x^2$$

Solving for $y^2+z^2$ for signal 330*c* and setting it equal to the previous equation:

$$y^2 + z^2 = r_3^2 - (x-i)^2 + 2*y*j - j^2 = r_1^2 - x^2$$

Solving for y:

$$y = \frac{r_1^2 - r_3^2 + i^2 + j^2 - 2*x*i}{2*j}$$

Solving the equation for signal 330*a* for z with equation for x and y:

$$z = \sqrt{r_1^2 - x^2 - y^2}$$

Therefore, from the derivation above and reference to FIG. 11, the location of the mobile communicator 470 may be determined by the method of trilateration.

Figure 12:
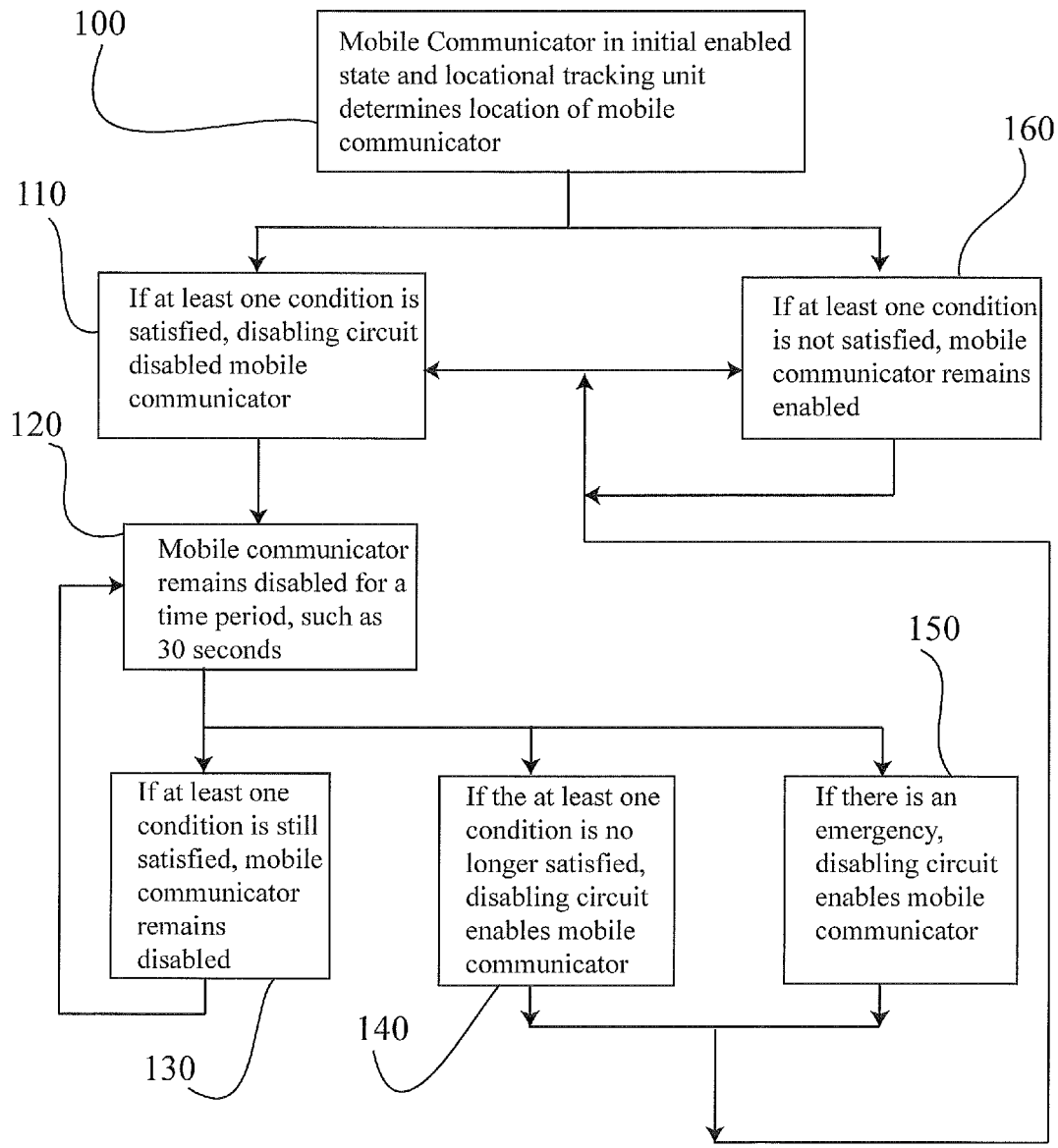
FIG. 12 is a diagram of the method for disabling a mobile communicator, in accordance with the present invention.

With further reference to FIGS. 8 and 9, the mobile communicator system 300 may operate as depicted in FIG. 12. As provided in FIG. 12, the mobile communicator 470 may be in an initial enabled state 100. In this example of the mobile communicator disabling system 300, the network of signal transceivers 310 may communicate with the locational tracking unit 610 of the mobile communicator 470 in order to determine the location of the mobile communicator 470. Referring to FIG. 12, if the at least one condition is not satisfied, the mobile communicator may remain enabled 160. The locational tracking unit 610 may continually communicate with the network of signal transceivers 310 to determine if the at least one condition is satisfied. However, if the at least one condition is satisfied, the disabling circuit may disable the mobile communicator 110. The at least one condition may comprise either of the retrieval of a privacy signal; or the present speed of the mobile communicator 470 may be greater than a pre-determined setpoint. As depicted in FIG. 12, the mobile communicator may remain disabled for 30 seconds or any period of time 120. Since the locational tracking unit 610 may continually determine the location of the mobile communicator 470 after the time period 120, such as 30 seconds, has elapsed, if the at least one condition is still satisfied, the mobile communicator may remain disabled 130 and may remain disabled for an additional time period 120, such as 30 seconds. However, if the at least one condition is not longer satisfied, the disabling circuit may re-enable the mobile communicator 140. Additionally, if there is an emergency, the disabling circuit may enable the mobile communicator 150.

A mobile communicator 470 disabling method 900, as described with reference to FIGS. 8 and 13, may comprise: providing a locational tracking unit 610 and a disabling circuit 550 to a mobile communicator 470, wherein the mobile communicator 470 is in an initial enabled state 910; determining the location 920 of the mobile communicator 470; determining that at least one condition for disablement of the mobile communicator 470 is satisfied 930; and disabling 940 the mobile communicator 470.

Figure 13:
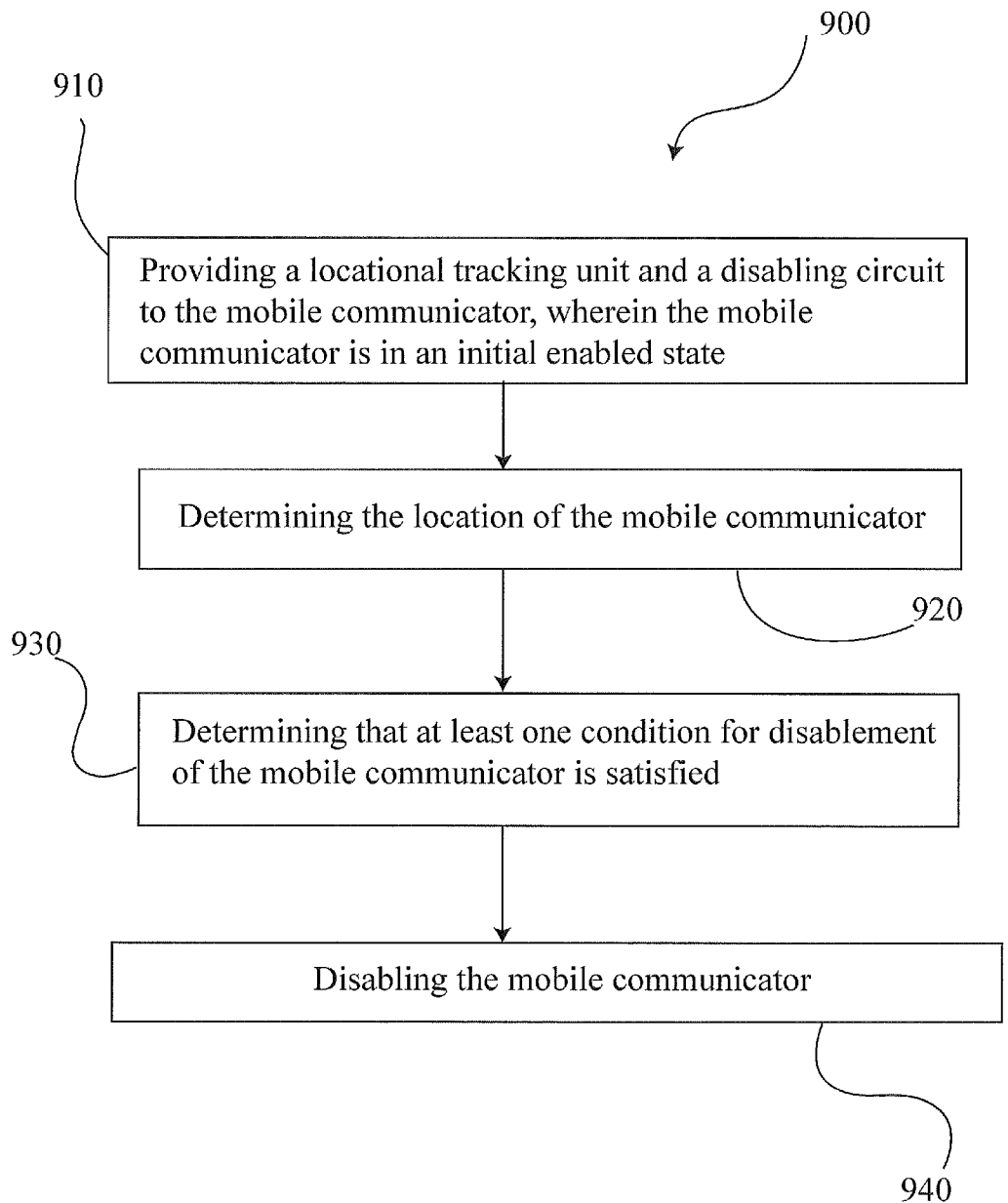
FIG. 13 is a diagram of the method for disabling a mobile communicator, in accordance with the present invention.

With continued reference to FIGS. 8 and 13, and with further reference to FIG. 9, determining the location 920 of the mobile communicator 470 may comprise of the locational tracking unit 610 communicating with a network of signal transceivers 310. The determination of the location 920 may further include triangulation, trilateration, multilateration, GPS positioning, cell identification, enhanced cell identification, etc.

Multilateration is a process of locating an object by accurately computing the Time Difference of Arrival (TDoA) of a signal emitted from the object to three or more receivers. TDoA uses the time it takes for a signal to travel as an indirect method of calculating distance. With a minimum of three base stations of signal transceivers, such as cell towers 320a-c, receiving a signal from a mobile communicator 470, the difference in time it takes for the signal 335 to reach each tower 320a-c can be used to determine the position of the mobile communicator 470.

Cell identification is a method that determines the position of a mobile communicator 470, based on signal strength. This is a simple method that provides a rough estimate of the location of the mobile communicator 470. The location of a cell tower 320a-c that is in communication with a mobile communicator 470 and is closest to the mobile communicator 470 is determined to be the rough location of the mobile communicator. The cell tower 320a-c that receives the strongest signal 335 from the mobile communicator 470 is closest to the mobile communicator 470.

This simple method is often used in conjunction with other techniques in order to increase the precision of the mobile positioning, such as the Global Positioning System (GPS) or Time of Arrival (ToA). ToA is similar to the TDoA technique, but differs in that it uses the absolute time of arrival at a certain base station, rather than the difference between stations.

Determining that at least one condition for disablement of the mobile communicator 470 is satisfied 930 may include the at least one condition for disablement to be either the retrieval of a privacy signal or the determination that the speed of the mobile communicator 470 is greater than a pre-determined setpoint.

Moreover, the initial enablement of the mobile communicator 910 may further comprise authenticating a user's voice and/or password with a voice recognition system 630 or determining the location of the mobile communicator 470 with the locational tracking unit 610.

The method for disabling a mobile communicator 900 may also comprise re-enabling the mobile communicator 470 as depicted in FIG. 12. The mobile communicator 470 may be enabled if the at least one condition is no longer satisfied 140. Further, if there is an emergency, the disabling circuit enables the mobile communicator 150. In one example, the method for disabling a mobile communicator 900 may also comprise enabling the mobile communicator in an emergency by speaking or verbalizing a word, e.g. "help," into a microphone 375 or inputting "help" via a keypad 340. In another example, this may also notify the location transmitter 570 to trigger the locator beacon 313. Moreover, an example may include enabling the mobile communicator 470 in an emergency in order for a user to call an emergency service provider 280 and the emergency service provider 280 may activate the locator beacon 313. Additionally, the emergency service provider 280 may be notified of the authorized user of the mobile communicator 470.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A Mobile Communicator having an initial Default Disabled State, comprising:
    a contact operable between an open configuration and a closed configuration and positioned to complete an electric circuit when the contact is in the closed position thereby activating the Mobile Communicator and providing the Mobile Communicator with functionality;
    a display;
    a notification mechanism for alerting a user;
    a user interface configured for allowing a user to enter a plurality of destination inputs, the plurality of destination inputs each associated with at least one of:
        numbers;
        letters; and
        numbers and letters;
    a transmitter in operable communication with the user interface and configured to send a transmission from the mobile communicator to a destination corresponding with the destination input;
    a receiver capable of receiving a transmission from a transmitting device; and
    an Enabling System, wherein the Enabling System includes an Enabling Circuit, wherein a logic of the Enabling Circuit has changed the initial Default Disabled State of the Mobile Communicator, wherein at least one of the display, the notification mechanism, the user interface, the transmitter and the receiver is disabled, to an Enabled State, wherein the at least one of the display, the notification mechanism, the user interface, the transmitter and the receiver become enabled, because an at least one condition has been satisfied;
    wherein the Mobile Communicator remains in the initial Default Disabled State, wherein at least one of the display, the notification mechanism, the user interface, the transmitter and the receiver is disabled, if the at least one condition is not satisfied, even when the contact is in the closed position and the activating electrical circuit is complete.

2. The apparatus of claim 1, wherein the at least one condition is that there is an emergency.

3. The apparatus of claim 1, wherein the at least one condition is that a GPS Receiver receives a GPS Signal.

4. The apparatus of claim 1, wherein the at least one condition is that the Mobile Communicator has a speed ≦a setpoint.

5. The apparatus of claim 4, wherein the speed is determined by at least one of triangulation, trilateration, multilateration, or GPS positioning.

6. The apparatus of claim 1, wherein the Mobile Communicator includes a privacy signal receiver configured to receive a privacy signal and wherein at least one condition is that the Mobile Communicator does not receive a Privacy Signal.

7. The apparatus of claim 6, wherein not receiving the privacy signal enables audible receiving and transmitting functions of the Mobile Communicator in a restricted use area.

8. The apparatus of claim 7, wherein each restricted use area is selected from the group consisting of a theater, a sports tournament, a hospital, a waiting room, a library, a spa, a passenger vehicle, a locker room, a business area housing trade secrets or confidential information, a conference room in which trade secrets or confidential proprietary information are discussed and combinations thereof.

9. The apparatus of claim 1, wherein a user of the Mobile Communicator speaking or verbalizing a predetermined word into a Microphone or inputting the predetermined word via a keyboard into the Enabling System, makes the Mobile Communicator operational to call an Emergency Service Provider and/or notify a Location Transmitter to trigger a Locator Beacon.

10. The apparatus of claim 9, wherein the Locator Beacon can be activated by the Emergency Service Provider resulting in the Locator Beacon emitting a locator signal.

11. The apparatus of claim 1, wherein the Mobile Communicator is configured to authenticate a voice of a user with a Voice Recognition System.

12. The apparatus of claim 11, wherein the Voice Recognition System authenticates the voice of the user by determining that each sound(s) provided by the user essentially matches a preprogrammed or recorded user identifying sound(s).

13. The apparatus of claim 1, wherein the at least one condition is that a user's voice and/or password is authenticated.

14. The apparatus of claim 13, wherein authenticating the voice or the password of the user identifies an authorized user of the Mobile Communicator to the Emergency Service Provider.

15. The apparatus of claim 1, wherein a name of a person to be called has been preprogrammed or recorded in an address book of the Enabling System.

16. The apparatus of claim 1, wherein when the at least one condition is that no privacy signal has been received, each privacy signal is selected from the group consisting of signals from broadcast and pager systems, signals from optical/infrared system, signals from acoustic/ultrasonic systems, 2.4 GHz, audible sounds, inaudible sounds and combinations thereof.

17. A kit for enabling a Mobile Communicator, comprising:
a Mobile Communicator having:
a contact operable between an open configuration and a closed configuration and positioned to complete an electric circuit when the contact is in the closed position thereby activating the Mobile Communicator and providing the Mobile Communicator with functionality;
a display;
a notification mechanism for alerting a user;
a user interface configured for allowing a user to enter a plurality of destination inputs, the plurality of destination inputs each associated with at least one of:
numbers;
letters; and
numbers and letters;
a transmitter in operable communication with the user interface and configured to send a transmission from the mobile communicator to a destination corresponding with the destination input; and
a receiver capable of receiving a transmission from a transmitting device;
further wherein the Mobile Communicator includes an initial Default Disabled State, wherein at least one of the display, the notification mechanism, the user interface, the transmitter and the receiver is disabled; and
an Enabling System, wherein the Enabling System includes an Enabling Circuit, and wherein a logic of the Enabling Circuit has enabled the Mobile Communicator, wherein transmitting and audible receiving functions become enabled, because an at least one condition has been satisfied; and
wherein the Mobile Communicator remains in the initial Default Disabled State if the at least one condition is not satisfied, wherein at least one of the display, the notification mechanism, the user interface, the transmitter and the receiver is disabled, even when the contact is in the closed position and the activating electrical circuit is complete.

18. The kit of claim 17, wherein the at least one condition is that the Mobile Communicator has a speed $\leq$ a setpoint and wherein the speed is determined by at least one of triangulation, trilateration, multilateration, or GPS positioning.

19. A method for enabling a Mobile Communicator having an initial Default Disabled State wherein transmitting and audible receiving functions are disabled, the method comprising:
providing an Enabling System in the Mobile Communicator, the Mobile Communicator comprising:
a display;
a notification mechanism for alerting a user;
a user interface configured for allowing a user to enter a plurality of destination inputs, the plurality of destination inputs each associated with at least one of:
numbers;
letters; and
numbers and letters;
a transmitter in operable communication with the user interface and configured to send a transmission from the mobile communicator to a destination corresponding with the destination input; and
a receiver capable of receiving a transmission from a transmitting device;
wherein the Mobile Communicator is in the Default Disabled State, wherein at least one of the display, the notification mechanism, the user interface, the transmitter and the receiver is disabled, and wherein the Mobile Communicator includes a contact operable between an open configuration and a closed configuration and positioned to complete an electric circuit when the contact is in the closed position thereby activating the Mobile Communicator and providing the Mobile Communicator with functionality;
satisfying an at least one condition for enablement of the Mobile Communicator; and
enabling the Mobile Communicator, wherein at least one of the display, the notification mechanism, the user interface, the transmitter and the receiver become enabled;
wherein the Mobile Communicator remains in the initial Default Disabled State, wherein at least one of the display, the notification mechanism, the user interface, the transmitter and the receiver is disabled, if the at least one condition is not satisfied, even when the contact is in the closed position and the activating electrical circuit is complete.

20. The method of claim 19, wherein the at least one condition is that the Mobile Communicator has a speed $\leq$ a setpoint and wherein the speed is determined by at least one of triangulation, trilateration, multilateration, or GPS positioning.

* * * * *